US008957910B2

(12) United States Patent
Ito et al.

(10) Patent No.: US 8,957,910 B2
(45) Date of Patent: Feb. 17, 2015

(54) GAME SYSTEM, GAME DEVICE, STORAGE MEDIUM STORING GAME PROGRAM, AND GAME PROCESS METHOD

(75) Inventors: Jun Ito, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 301 days.

(21) Appl. No.: 13/287,303

(22) Filed: Nov. 2, 2011

(65) Prior Publication Data

US 2012/0165099 A1  Jun. 28, 2012

(30) Foreign Application Priority Data

Dec. 22, 2010 (JP) ................................ 2010-286209

(51) Int. Cl.
*G09G 5/00* (2006.01)
*G06T 15/00* (2011.01)
*A63F 13/40* (2014.01)

(52) U.S. Cl.
CPC ........... *A63F 13/10* (2013.01); *A63F 2300/301* (2013.01); *A63F 2300/303* (2013.01); *A63F 2300/6661* (2013.01); *A63F 2300/8076* (2013.01)
USPC .......................................... 345/619; 345/419

(58) Field of Classification Search
CPC ....... G06F 17/00–17/608; G06T 1/00–1/0092; G06T 15/00–15/005; G09G 5/00–5/008
USPC .......................................... 345/418, 419, 619
See application file for complete search history.

(56) References Cited

U.S. PATENT DOCUMENTS

| | | | | |
|---|---|---|---|---|
| 7,308,080 | B1 * | 12/2007 | Moriuchi et al. | 379/88.04 |
| 7,620,900 | B2 * | 11/2009 | Kawashima et al. | 715/754 |
| RE42,336 | E * | 5/2011 | Fateh et al. | 345/8 |
| 2005/0264527 | A1 * | 12/2005 | Lin | 345/156 |
| 2007/0075917 | A1 * | 4/2007 | Nishi | 345/8 |
| 2008/0024594 | A1 * | 1/2008 | Ritchey | 348/36 |
| 2008/0096657 | A1 * | 4/2008 | Benoist | 463/36 |
| 2008/0150899 | A1 * | 6/2008 | Lin | 345/168 |
| 2009/0209343 | A1 * | 8/2009 | Foxlin et al. | 463/36 |
| 2009/0254843 | A1 * | 10/2009 | Van Wie et al. | 715/757 |

(Continued)

OTHER PUBLICATIONS

Web site of "GoldenEye 007", URL: http://www.nintendo.co.jp/n01/n64/software/nus_p_ngej/, and English translation thereof, Aug. 1997.

*Primary Examiner* — Jacinta M Crawford
(74) *Attorney, Agent, or Firm* — Nixon & Vanderhye, P.C.

(57) ABSTRACT

An example game system includes a controller device, and a game process section for performing a game process based on an operation on the controller device. The controller device includes a plurality of direction input sections, a sensor section for obtaining a physical quantity used for calculating an attitude of the controller device, and a display section for displaying a game image. The game process section first calculates the attitude of the controller device based on the physical quantity obtained by the sensor section. Then, the game process section controls an attitude of a virtual camera in a virtual space based on the attitude of the controller device, and controls a position of the virtual camera based on an input on the direction input section. A game image to be displayed on the display section is generated based on the position and the attitude of the virtual camera.

58 Claims, 18 Drawing Sheets

(56) References Cited

U.S. PATENT DOCUMENTS

| | | | |
|---|---|---|---|
| 2010/0103099 A1* | 4/2010 | Lee | 345/158 |
| 2010/0241998 A1* | 9/2010 | Latta et al. | 715/862 |
| 2011/0059793 A1* | 3/2011 | Kondo et al. | 463/30 |
| 2011/0190061 A1* | 8/2011 | Takeda et al. | 463/39 |
| 2011/0199298 A1* | 8/2011 | Bassompiere et al. | 345/157 |
| 2012/0086631 A1* | 4/2012 | Osman et al. | 345/156 |
| 2012/0179672 A1* | 7/2012 | Van Wie et al. | 707/723 |

* cited by examiner ated with the game process section and the game process method for the embodiment to be described below and the program to be described below. This disclosure is not limited to the embodiment to be described below.

GAME SYSTEM, GAME DEVICE, STORAGE MEDIUM STORING GAME PROGRAM, AND GAME PROCESS METHOD

CROSS REFERENCE TO RELATED APPLICATIONS

The disclosure of Japanese Patent Application No. 2010-286209 filed on Dec. 22, 2010, is incorporated herein by reference.

FIELD

The present specification discloses a game system, a game device, a storage medium storing a game program, and a game process method for giving input commands for a plurality of directions in a game space.

BACKGROUND AND SUMMARY

There are conventional game systems with which one can give input commands for a plurality of directions in a game space. For example, there are games in which one can give commands for a plurality of moving directions of a player character in the game space and the viewpoint (virtual camera) using two direction input mechanisms (a stick, a button, etc.). In such a game, it is possible to specify a movement of the player character in the forward-backward direction and a rotation thereof in the left-right direction by using a stick provided on a controller, for example. It is further possible to specify a translating movement of a player character in the left-right direction and a change in the viewing direction in the up-down direction by using a direction-input button provided on the controller.

With the game operation method above, however, since the moving direction of an object or a virtual camera is controlled only with two direction input mechanisms, it is not possible to give an input command for a particular direction, and the number of directions for which commands can be given at the same time may not be sufficient. Specifically, with the game operation method above, it is not possible to give a command for moving the player character in the up-down direction. In order to make it possible to give commands for multiple directions, one may assign a single input command to two different directions in the game space so that the two different directions can be switched from one to another in response to a switching operation. However, this method requires a switching operation, and it is therefore not possible to simultaneously give input commands for the two different directions. As described above, with conventional games, a player may not be able to comfortably perform input operations for giving input commands for a plurality of directions.

Therefore, the present specification discloses a game system, a game device, a storage medium storing a game program, and a game process method with which it is possible to improve the controllability in giving input commands for a plurality of directions.

(1)

An example game system described in the present specification includes a first controller device, and a game process section for performing a game process based on an operation on the first controller device.

The first controller device includes a plurality of direction input sections, a sensor section, and a display section. The sensor section obtains a physical quantity used for calculating an attitude of the first controller device. The display section displays a game image.

The game process section includes an attitude calculation section, a camera attitude control section, a camera position control section, and an image generation section. The attitude calculation section calculates the attitude of the first controller device based on the physical quantity obtained by the sensor section. The camera attitude control section controls an attitude of a virtual camera in a virtual space based on the attitude of the first controller device. The camera position control section controls a position of the virtual camera based on an input on the direction input section. The image generation section generates the game image to be displayed on the display section based on the position and the attitude of the virtual camera.

The "first controller device" is a concept including any device which has a direction input section, a sensor section, and a display section, and is a concept including a terminal device of the embodiment to be described below and a portable game device of (18) below.

The "game system" may be any system including a first controller device and a game process section, and the game system may be a plurality of devices as shown in the embodiment to be described below or (15) to (17) below, or may be a single game device such as the portable game device of (18) below.

The "direction input section" may be any input device capable of making inputs at least in two directions, e.g., the up-down direction and the left-right direction, such as a cross button, a touch panel or a touch pad, as well as an analog stick of the embodiment to be described below.

The "physical quantity" may be any quantity as long as it is possible to calculate (estimate) the attitude of the controller device based on the quantity. The "sensor section" may be any section as long as it is capable of detecting such a "physical quantity. For example, the "sensor section" may be an inertia sensor such as the angular velocity sensor or the acceleration sensor of the embodiment to be described below, or it may be a magnetic sensor or a camera. In a case in which the sensor section is a magnetic sensor, the azimuthal direction information detected by the magnetic sensor corresponds to the physical quantity. In a case in which the sensor section is a camera, a value regarding a captured image (e.g., pixel values) or a value obtained from the image (e.g., the position coordinates of a predetermined image-capturing object in the captured image) corresponds to the physical quantity.

The "camera position control section" may calculate the position of the virtual camera directly from an input on the direction input section, or may control the position of the virtual camera in accordance with the position of the predetermined object which is controlled based on an input on the direction input section as in (2) below or the embodiment to be described below.

With the configuration (1) above, the position of the virtual camera is controlled by operations on a plurality of direction input sections, and the attitude of the virtual camera is controlled by an operation of changing the attitude of the first controller device. That is, the player can give a plurality of different direction input commands using a plurality of direction input sections, and can give a direction input command also by an operation of changing the attitude of the first controller device. Moreover, the player can simultaneously move and rotate the virtual camera by simultaneously giving these direction input commands. As described above, with the configuration (1) above, it is possible to improve the controllability in giving input commands for a plurality of directions.

With the configuration (1) above, since the attitude of the virtual camera is controlled based on the attitude of the first controller device, the player can change the viewing direction of the game image displayed on the first controller device in an easy and intuitive operation by performing the operation of changing the attitude of the first controller device.

(2)

The game process section may further include an object control section for controlling a position of a predetermined object in the virtual space based on an input on the direction input section. Then, the camera position control section controls a position of the virtual camera so that the predetermined object is included in a viewing field range of the virtual camera.

With the configuration (2) above, the player can move the predetermined object (and the virtual camera) by an operation on the direction input section, and can change the viewpoint and the viewing direction with which to view the predetermined object by an operation of changing the attitude of the first controller device. Thus, it is possible to easily perform a game operation of looking over the object's surroundings while moving the predetermined object.

(3)

The object control section may control an attitude of the predetermined object based on an input on the direction input section. Then, when the attitude of the predetermined object is changed by the object control section at least for a predetermined direction, the camera attitude control section changes the attitude of the virtual camera so that the attitude of the predetermined object and the attitude of the virtual camera are matched with each other for the predetermined direction.

With the configuration (3) above, the player can change the attitude of the predetermined object by an operation on the direction input section. With the configuration (3) above, when the attitude of the predetermined object is changed by an operation on the direction input section for the predetermined direction, the attitude of the virtual camera is also changed so as to be matched with the attitude of the predetermined object. Then, since the direction of the predetermined object and the direction of the virtual camera are matched with each other for the predetermined direction, it is possible to avoid awkwardness due to the viewing direction in the game image being different from the direction of the controlled object (the object) included in the game image, thereby further improving the controllability of the object.

(4)

When the attitude of the virtual camera is changed for a predetermined direction in response to a change in an attitude of the first controller device, the object control section may change the attitude of the object so that the attitude of the predetermined object and the attitude of the virtual camera are matched with each other for the predetermined direction.

With the configuration (4) above, when the attitude of the virtual camera is changed by an operation of changing the attitude of the first controller device for the predetermined direction, the attitude of the predetermined object is also changed so as to be matched with the attitude of the virtual camera. Thus, since the direction of the predetermined object and the direction of the virtual camera are matched with each other for the predetermined direction, it is possible to avoid awkwardness due to the viewing direction in the game image being different from the direction of the controlled object included in the game image, thereby further improving the controllability of the object.

(5)

When the attitude of the virtual camera changes in response to a change in the attitude of the first controller device for the predetermined direction at least at a predetermined velocity or more, the object control section may match the attitude of the object and the attitude of the virtual camera with each other by gradually changing the attitude of the object so as to follow the virtual camera.

With the configuration (5) above, the object control section can change the attitude of the object gradually so as to follow the attitude of the virtual camera when the attitude of the virtual camera has changed at least at a predetermined velocity or more. Therefore, if the attitude of the virtual camera changes at a lower velocity than the predetermined velocity, the attitude of the object may be changed so as to be matched with the attitude of the virtual camera (with no delay) or the attitude of the object may be changed gradually so as to follow (with a delay) the attitude of the virtual camera.

With the configuration (5) above, when the attitude of the virtual camera is changed by an operation of changing the attitude of the first controller device at a predetermined velocity or more, the attitude of the object is changed gradually so as to follow the attitude of the virtual camera. Then, since it is possible to prevent the attitude of the object from abruptly changing so as to be matched with the change in the attitude of the virtual camera, it is possible to prevent the action of the object from being unnatural.

(6)

The object control section controls a movement of the predetermined object in a predetermined first moving direction that has a component of a viewing direction of the virtual camera in response to a first direction input on a first direction input section of the first controller device. Together with this, the object control section may control a movement of the predetermined object in a second moving direction that is perpendicular to the first moving direction and corresponds to a screen up-down direction of the display section in response to a second direction input on a second direction input section of the first controller device.

The "first moving direction" is not limited to the direction parallel to the viewing direction, but may be any direction which has a component of the viewing direction of the virtual camera. The "second moving direction" may be any direction as long as it is a direction perpendicular to the first moving direction, and is such a direction that the predetermined object appears as if it were moving in the screen up-down direction on the screen when the predetermined object moves in that direction.

With the configuration (6) above, the player can perform operations on the first direction input section and the second direction input section so as to move the predetermined object in the viewing direction of the virtual camera and also in the screen up-down direction. Then, since the player can simultaneously move the object both in the screen depth direction and in the up-down direction, it is possible to further improve the controllability in moving the object in the three-dimensional space.

(7)

The object control section may control a movement of the predetermined object in a third moving direction that is perpendicular to the first and second moving directions in response to a third direction input on one of the first and second direction input sections.

With the configuration (7) above, since the player can move the predetermined object in any direction in the three-dimensional space by performing operations on two direction input sections, the operation of moving an object in a three-dimensional space can be made even easier.

(8)

The object control section may control an attitude of the object in response to a fourth direction input on the other one of the first and second direction input sections.

With the configuration (8) above, the player can not only move the object in any direction in the three-dimensional space by means of the direction input section, but also change the attitude of the object.

(9)

The direction input section may be such that at least up, down, left and right directions can be input with the direction input section. Then, the first direction input and the second direction input are inputs in the up-down direction. The third direction input and the fourth direction input are inputs in the left-right direction.

With the configuration (9) above, since movements of the object corresponding to the screen depth direction and the up-down direction are made in response to inputs on the direction input section in the up-down direction, player can easily operate the object with a natural control feel.

(10)

The first controller device may further include a depressible key operation section. Then, the object control section has the predetermined object execute a predetermined action in response to a key operation on the key operation section.

With the configuration (10) above, the player can have the object execute a predetermined action by an operation on the key operation section. Then, it is possible to easily perform a game operation of having a predetermined object execute a predetermined action with appropriate timing while moving the object and looking over the object's surroundings.

(11)

The first controller device may further include a touch panel provided on a screen of the display section. Then, the object control section has the predetermined object execute a predetermined action in response to an operation on the touch panel.

With the configuration (11) above, the player can have the object execute a predetermined action by an operation on the touch panel. Then, it is possible to easily perform a game operation of having a predetermined object execute a predetermined action with appropriate timing while moving the object and looking over the object's surroundings.

(12)

The plurality of direction input sections may be a first direction input section and a second direction input section provided on a left and a right side of the display section. Then, with each direction input section, an input operation can be performed by moving an operation member that is movable in any two-dimensional direction.

With the configuration (12) above, since two direction input sections are provided on a left and a right side of the display section, the player can perform operations on the two direction input sections and perform an operation of changing the attitude of the first controller device, by holding the left side and the right side of the screen. Then, it is easier to simultaneously perform these operations, and it is therefore possible to improve the controllability of the first controller device. The player can make subtle direction inputs by input operations on the operation member.

(13)

The sensor section may include an inertia sensor.

The "inertia sensor" may be any inertia sensor, e.g., a three-axis acceleration sensor, or a three-axis gyrosensor.

With the configuration (13) above, with the use of the inertia sensor, it is possible to precisely detect the movement and the attitude of the first controller device.

(14)

In response to a predetermined operation specifying a position on a screen of the display section, the game process section performs a process of shooting at a position in the virtual space corresponding to the specified position.

With the configuration (14) above, in a shooting game where a player shoots at the screen, the player can easily move the viewpoint of the game image and change the viewing direction thereof by game operations using the first controller device. That is, with the configuration (14) above, it is possible to provide a shooting game with which it is easy to perform, with the first controller device, complicated operations of moving the viewpoint and changing the viewing direction.

(15)

The game system may include a game device and one or more second controller device. The game device includes the game process section and outputs a game image to a predetermined display device different from the display section. The second controller device is a controller device different from the first controller device. Then, the game process section performs a game process based on an operation on the first controller device and an operation on the second controller device. The image generation section generates a game image to be displayed on the display section, and a game image to be displayed on the predetermined display device.

The "game device" may be any information processing device capable of performing game processes to generate an image based on the game processes. The game device may be a single-purpose information processing device for games, or a general-purpose information processing device such as an ordinary personal computer.

The "second controller device" may be any controller device with which the player can make inputs for game operations, as well as the controller of the embodiment to be described below.

With the configuration (15) above, it is possible to provide a multi-player game in which a player (referred to as the "first player") who controls the first controller device plays the game looking at the game image displayed on the display section, whereas a player ("second player") who controls the second controller device plays the game looking at the game image displayed on the predetermined display device. Since the first player can freely change the viewing direction by changing the attitude of the first controller device, the first player can look around across a wide area in the virtual space. Therefore, for example, even when there are a plurality of second controller devices, and a single first player and a plurality of second players play against each other, it will not be excessively disadvantageous for the first player, and therefore the configuration (15) above can be applied advantageously to one-on-many battle games.

(16)

The game process section may have a first object, which is moved in any three-dimensional direction in the virtual space based on an input on the direction input section, execute a shooting action based on an operation on the first controller device, and have a second object, which can move on a predetermined plane in the virtual space, execute a moving action and a shooting action based on an operation on the second controller device.

The "first object" may be any object as long as it can move in any three-dimensional direction in the virtual space based on an operation on the first controller device, as well as the helicopter of the embodiment to be described below.

The "second object" may be any object as long as it can move along a predetermined plane in the virtual space (e.g., the ground formed in the virtual space) based on an operation on the first controller device, as well as the player object of the embodiment to be described below.

With the configuration (16) above, it is possible to realize a shooting game of a type in which a first object, which is capable of three-dimensionally moving across the virtual space, and a second object, which is capable of moving along a predetermined plane in the virtual space, battle against each other. Herein, the player who controls the first controller device can move the first object in the forward-backward, left-right and up-down directions of the three-dimensional space, and can freely change the viewing direction (shooting direction). That is, the player can easily perform operations for executing a moving action and a shooting action of the first object with the first controller device.

(17)

The game system may include a game device including the game process section. Then, the game device includes an image transmitting section for compressing and wirelessly transmitting the game image. The first controller device includes an image receiving section for receiving and expanding the compressed game image which is transmitted by the image transmitting section. The display section displays the game image expanded by the image receiving section.

With the configuration (17) above, a game system is constructed with a first controller device which is held by the player, and a game device separate from the first controller device. Herein, the processing load on the first controller device can be kept low within a predetermined range since the first controller device may only need to expand the image data, and game processes can be performed by the game device. Since the first controller device is not required to have high information processing capabilities, it is easy to reduce the size and weight of the first controller device, which is held by the player, thereby facilitating the manufacture thereof. Moreover, with the configuration (17) above, since the game image is transmitted from the game device to the first controller device in a compressed form, the game image can be wirelessly transmitted at a high speed, and it is possible to reduce the delay from when a game process is performed until a game image is displayed.

(18)

The first controller device may be a portable game device including the game process section.

With the configuration (18) above, it is possible to implement a game system with a portable game device.

The present specification discloses an example game device including a game process section in the game system of (1) to (18) above. The present specification also discloses an example computer-readable storage medium storing a game program instructing a computer of the game device to execute functions equivalent to various portions in the game process section. The present specification further discloses an example game process method to be carried out by the input system or game system of (1) to (18) above.

With the game system, the game device, the storage medium storing a game program, and the game process method described above, it is possible to control the position of the virtual camera by operations on a plurality of direction input sections, and control the attitude of the virtual camera by an operation of changing the attitude of the first controller device. Thus, it is possible to simultaneously perform operations on a plurality of direction input sections and an operation of changing the attitude of the first controller device, thereby improving the controllability in giving input commands for a plurality of directions.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. General Configuration of Game System]

Figure 1:
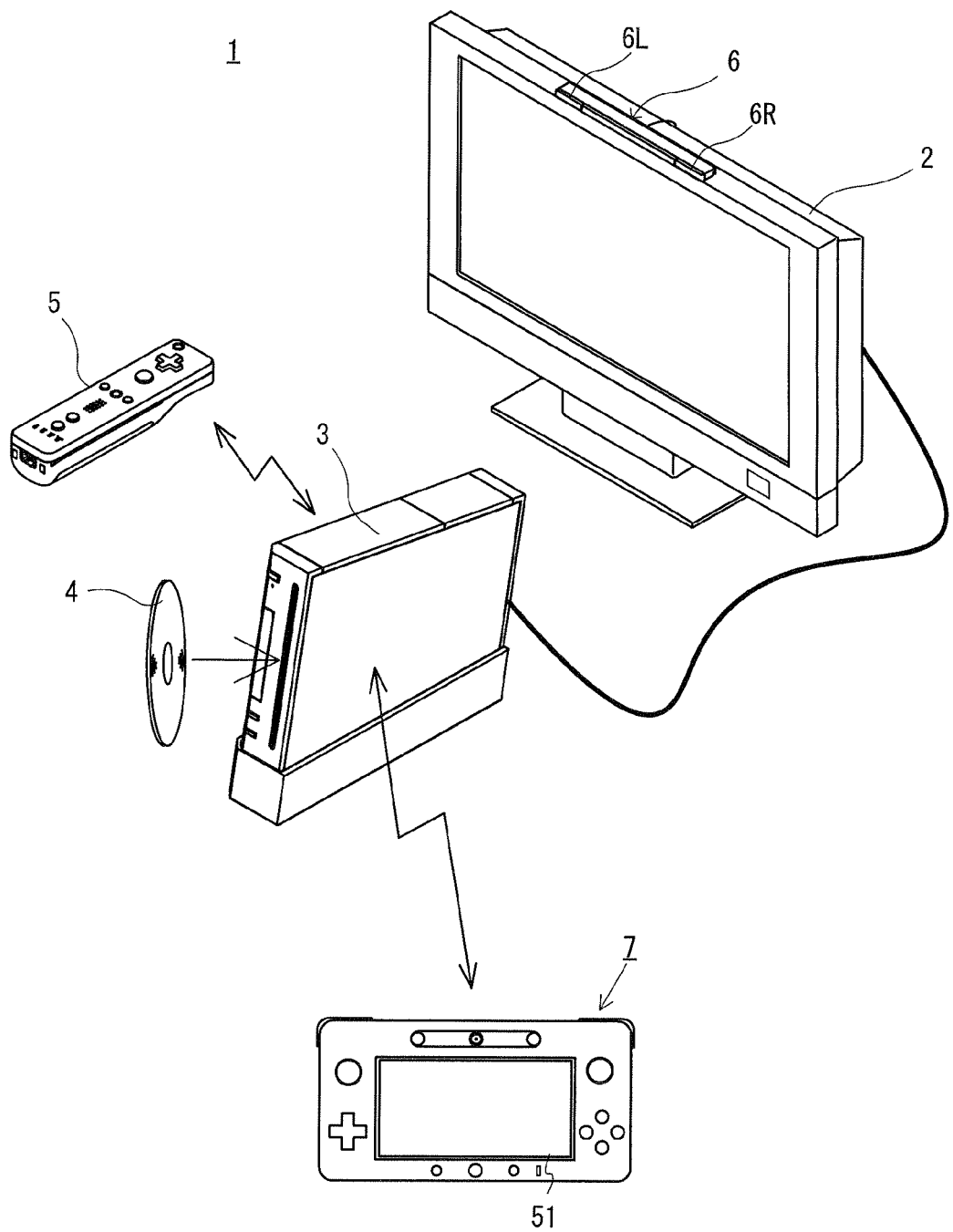
FIG. 1 is an external view of an example non-limiting game system 1.

An example game system 1 of the present embodiment will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, a game device 3 performs game processes based on game operations performed using the controller 5, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3, and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, a controller 5 and the game device 3 may be connected by a wired connection. While only one controller 5 is included in the game system 1 in the present embodiment, the game device 3 can communicate with a plurality of controllers, and a game can be played by multiple players by using a predetermined number of controllers at the same time. The detailed configuration of the controller 5 will be described below.

The terminal device 7 is sized so that it can be held by the user, and the user can hold and move the terminal device 7, or can use a terminal device 7 placed at an arbitrary position. The terminal device 7, whose detailed configuration will be described below, includes an LCD (Liquid Crystal Display) 51 as a display, input mechanisms (e.g., a touch panel 52, a gyrosensor 64, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, a terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
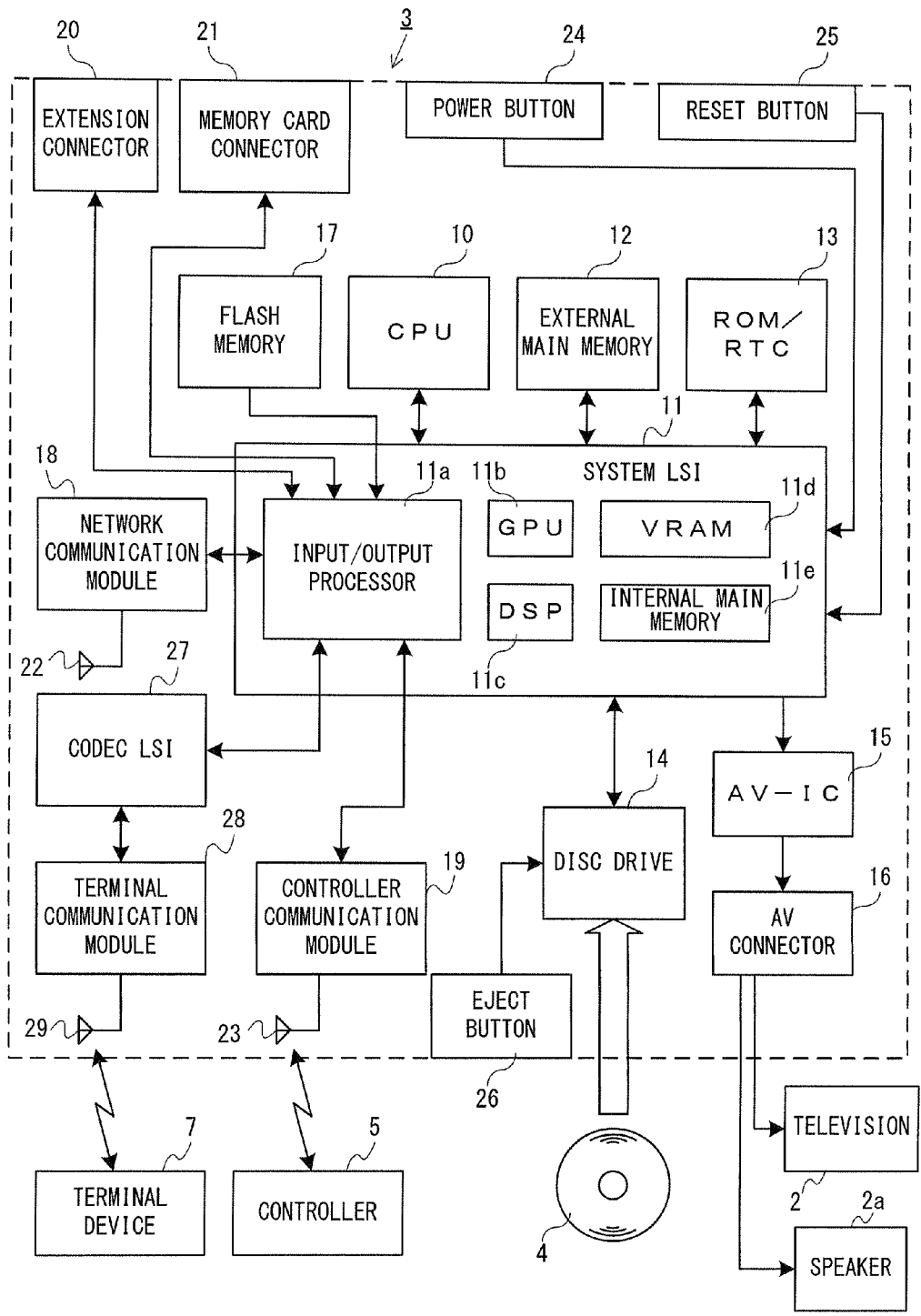
FIG. 2 is a block diagram showing an internal configuration of an example non-limiting game device 3.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) used for the GPU 11b to execute the graphics commands. When images are generated, the GPU 11b generates image data using data stored in the VRAM 11d. In the present embodiment, the game device 3 generates both game images displayed on the television 2 and game images displayed on the terminal device 7. Hereinafter, the game images displayed on the television 2 may be referred to as the "television game images", and the game images displayed on the terminal device 7 may be referred to as the "terminal game images".

The DSP 11c, functioning as an audio processor, generates sound data using sound data and sound waveform (e.g., tone quality) data stored in one or both of the internal main memory 11e and the external main memory 12. In the present embodiment, as with the game images, game sounds to be outputted from the speaker of the television 2 and game sounds to be outputted from the speaker of the terminal device 7 are both generated. Hereinafter, the game sounds outputted from the television 2 may be referred to as "television game sounds", and the game sounds outputted from the terminal device 7 may be referred to as "terminal game sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11e is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a is connected to a network such as the Internet via the network communication module 18 and the antenna 22 and can communicate with external information processing device (s) connected to the network. The input/output processor 11a regularly accesses the flash memory 17, and detects the presence or absence of any data which is to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it may be a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker section (a marker section 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
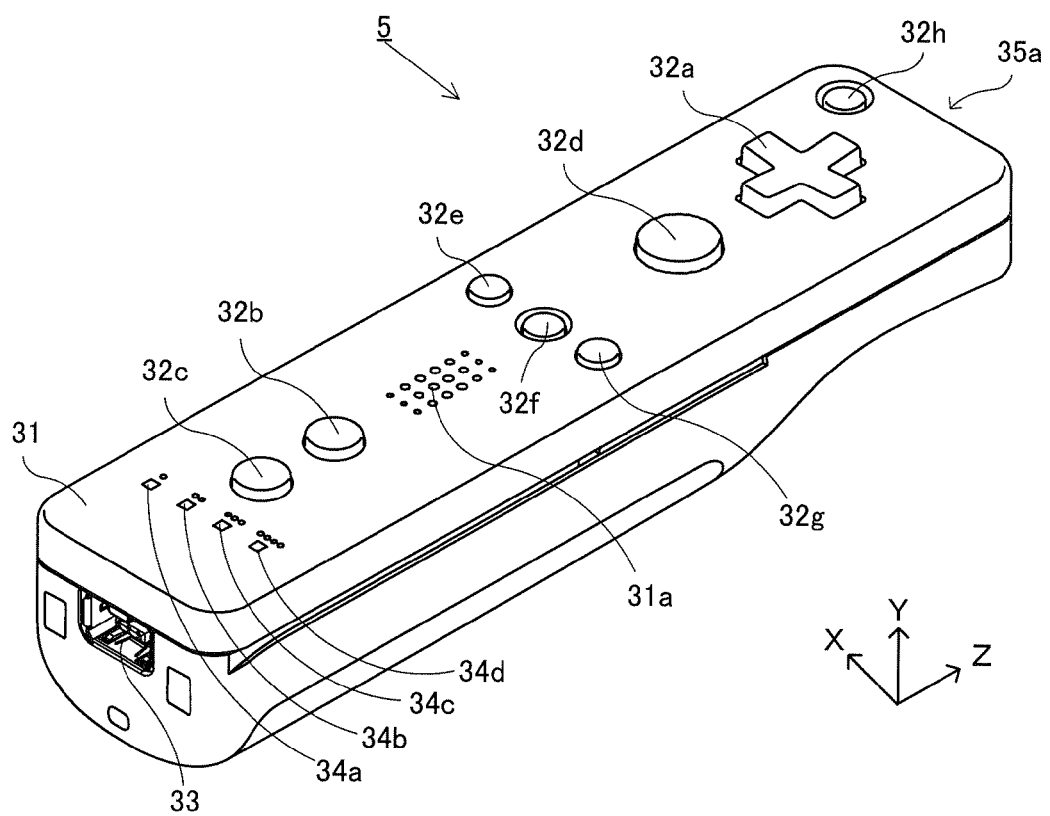
FIG. 3 is a perspective view showing an external configuration of an example non-limiting controller 5.
Figure 4:
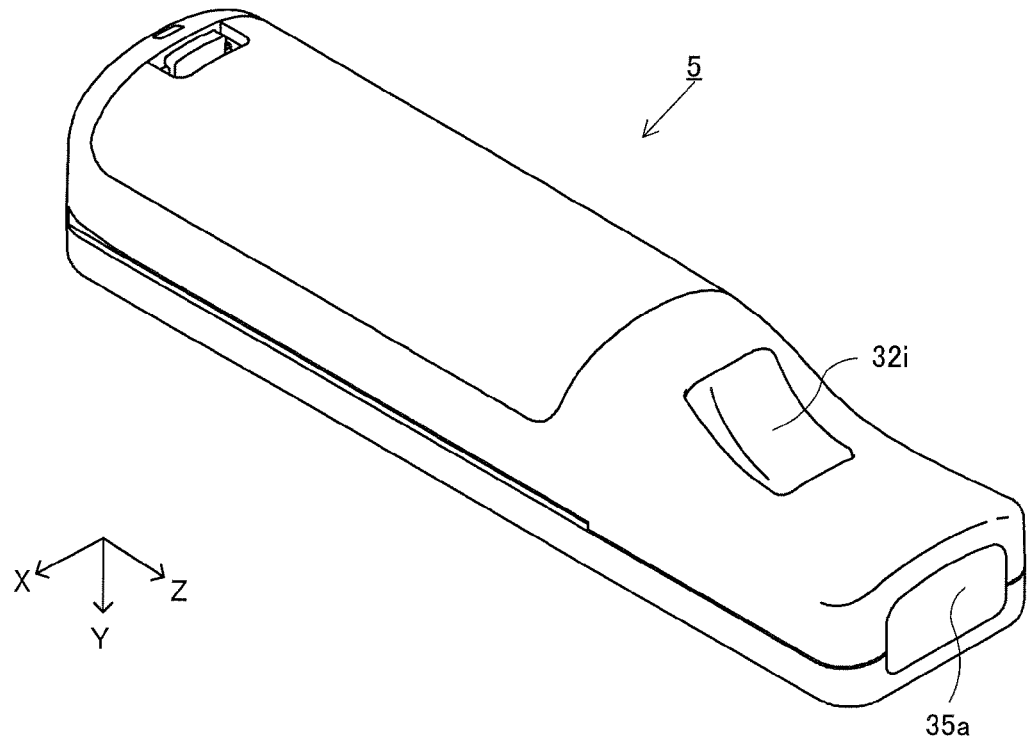
FIG. 4 is a perspective view showing an external configuration of the example non-limiting controller 5.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing section 35 (FIG. 6), and a light incident surface 35a of an image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
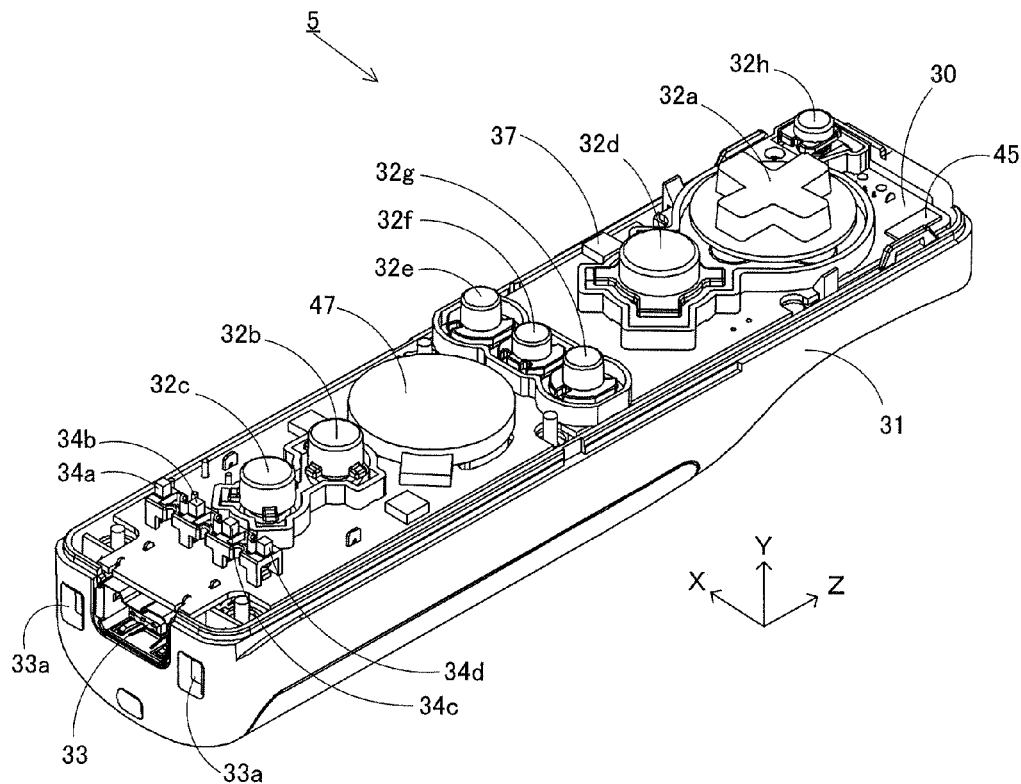
FIG. 5 is a diagram showing an internal configuration of the example non-limiting controller 5.
Figure 6:
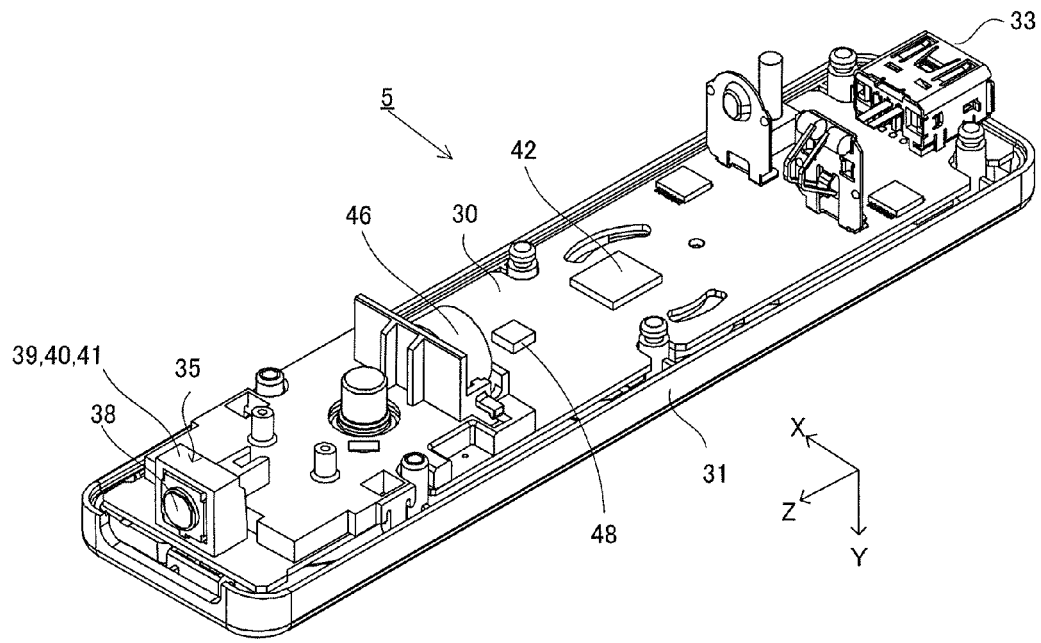
FIG. 6 is a diagram showing an internal configuration of the example non-limiting controller 5.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing section is the Z-axis positive direction, the image-capturing direction may be any direction. That is, the position of the image capturing/processing section 35 (the light incident surface 35a of the image capturing/processing section 35) in the controller 5 may not be on the front surface of the housing 31, but may be on any other surface on which light can be received from the outside of the housing 31.

Figure 7:
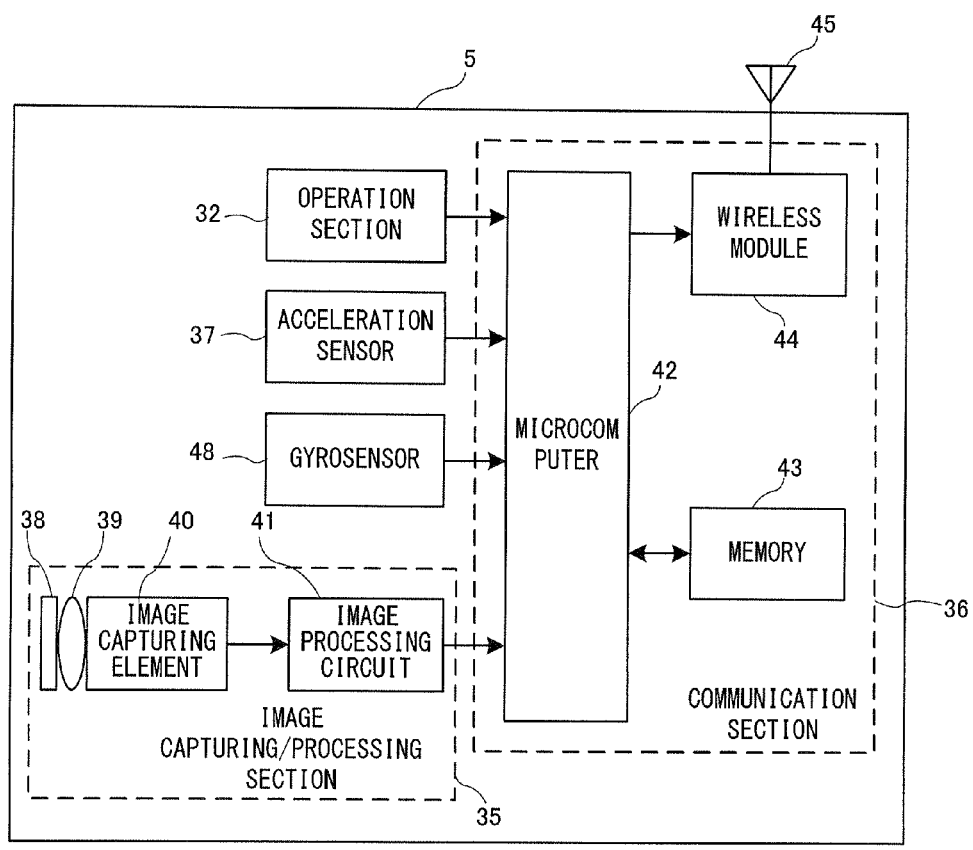
FIG. 7 is a block diagram showing a configuration of the example non-limiting controller 5.

FIG. 7 is a block diagram illustrating a configuration of the controller 5. The controller 5 includes an operation section 32 (the operation buttons 32a to 32i), the image capturing/processing section 35, a communication section 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation section 32 includes the operation buttons 32a to 32i described above, and outputs, to the microcomputer 42 of the communication section 36, operation button data indicating the input status of the operation buttons 32a to 32i (e.g., whether or not the operation buttons 32a to 32i are pressed).

The image capturing/processing section 35 is a system for analyzing image data captured by the image-capturing element and calculating the centroid, the size, etc., of an area (s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, an image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of a marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle(s) (or another suitable parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to a controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication section 36 to the controller communication module 19 is sequentially performed with a predetermined cycle, since the game process is generally performed with a cycle of 1/60 sec (as one frame period), the transmission may be performed with a cycle less than or equal to this period. The communication section 36 of the controller 5 outputs, to the controller communication module 19 of the game device 3, the operation data at a rate of once per 1/200 sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

[4. Configuration of Terminal Device 7]

Figure 8:
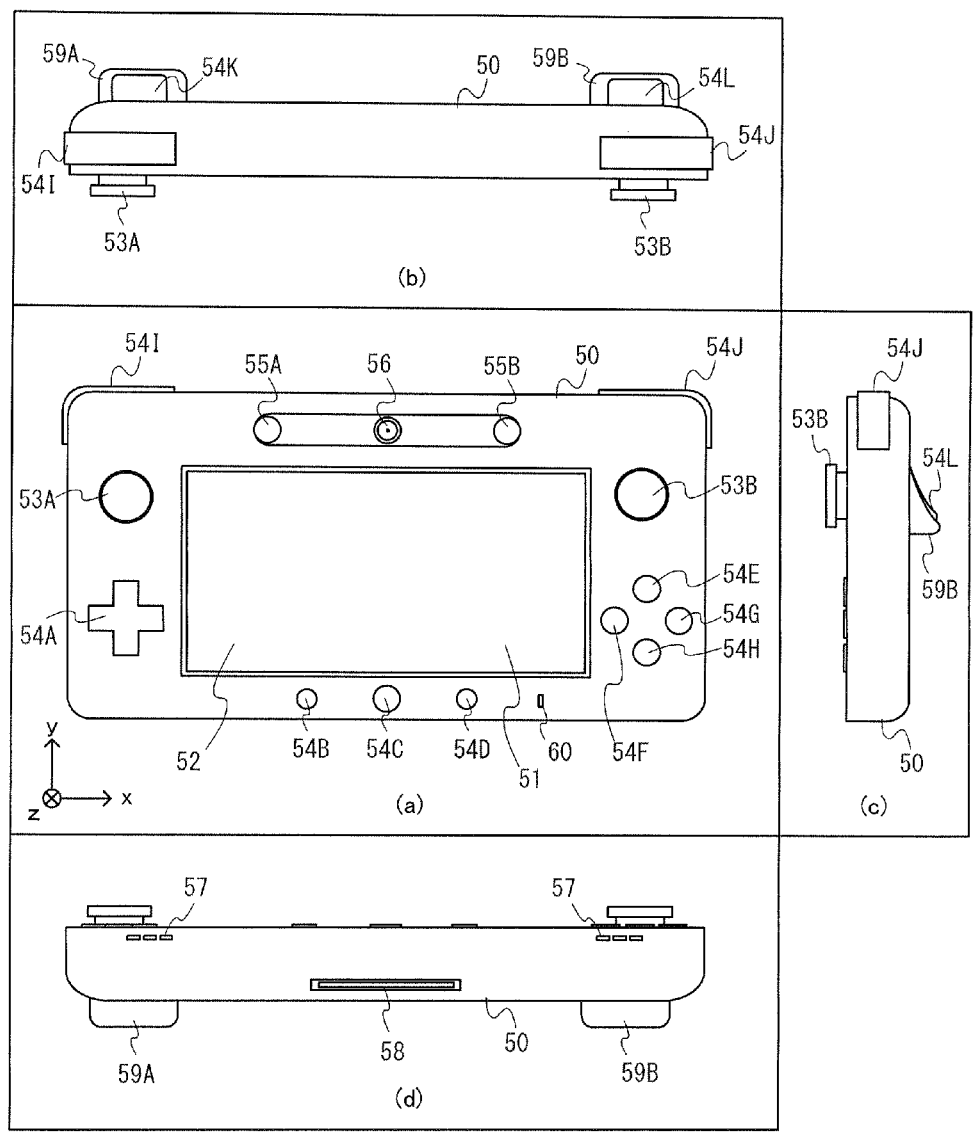
FIG. 8 is a diagram showing an external configuration of an example non-limiting terminal device 7.
Figure 9:
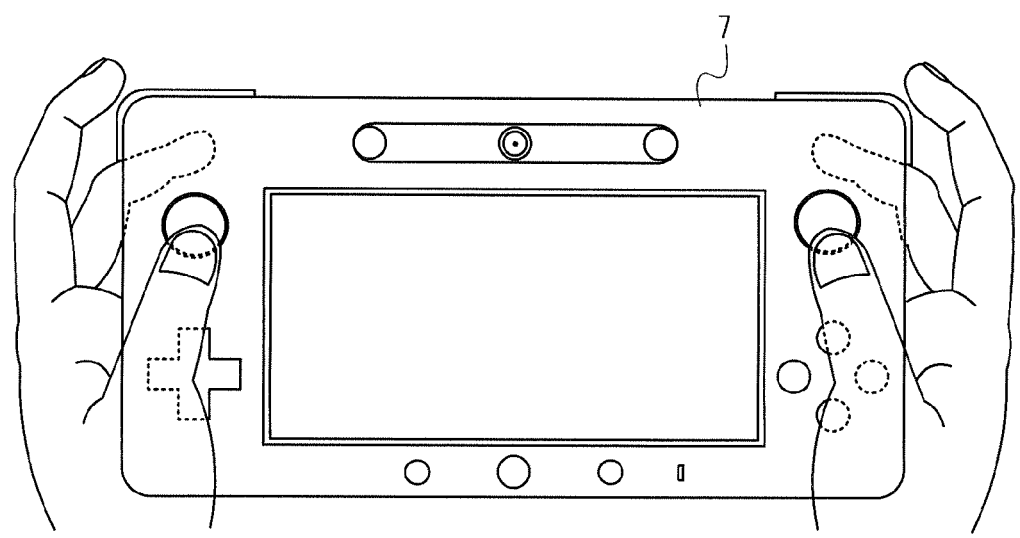
FIG. 9 is a diagram showing the example non-limiting terminal device 7 being held by a user.
Figure 10:
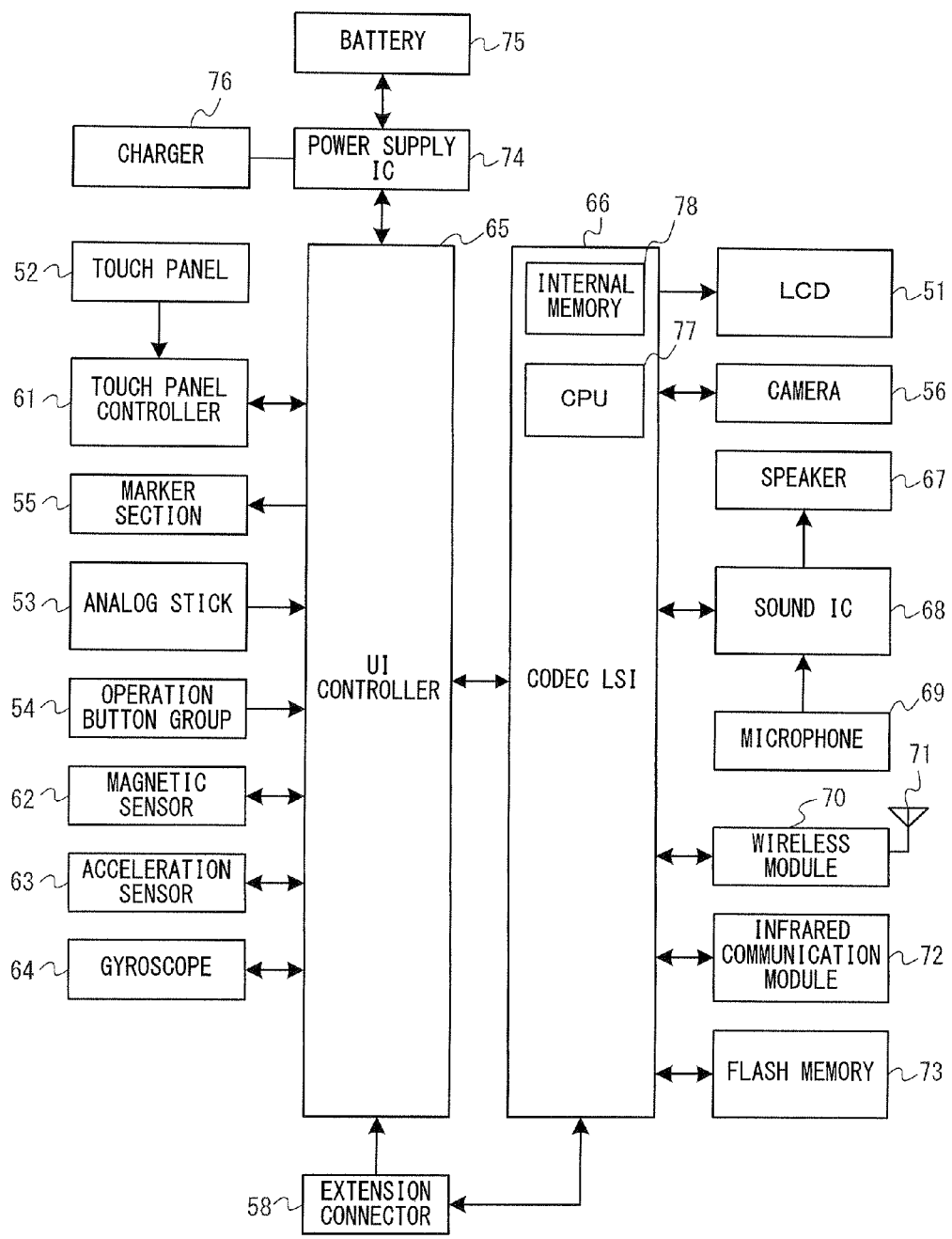
FIG. 10 is a block diagram showing an internal configuration of the example non-limiting terminal device 7.

Next, a configuration of a terminal device 7 will be described with reference to FIGS. 8 to 10. FIG. 8 is a diagram showing an external configuration of the terminal device 7. FIG. 8(a) is a front view of the terminal device 7, FIG. 8(b) is a top view thereof, FIG. 8(c) is a right side view thereof, and FIG. 8(d) is a bottom view thereof. FIG. 9 is a diagram showing a user holding the terminal device 7.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes an LCD 51 on the front surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. While FIG. 9 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(a), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen is usually used for making inputs on the touch panel 52, an input may be made on the touch panel 52 with a finger of the user, instead of using the touch pen. The housing 50 may be provided with a hole for accommodating the touch pen used for performing operations on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54L, as operation mechanisms. The analog sticks 53A and 53B are each a direction-specifying device. The analog sticks 53A and 53B are each configured so that the stick portion operated with a finger of the user can be slid (or tilted) in any direction (at any angle in the up, down, left, right and diagonal directions) with respect to the surface of the housing 50. The left analog stick 53A is provided on the left side of the screen of the LCD 51, and a right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are operation mechanisms for making predetermined inputs. As will be discussed below, the buttons 54A to 54L are provided at such positions that the user can operate them while holding the left and right portions of the terminal device 7 (see FIG. 9). Therefore, the user can easily operate these operation mechanisms even when holding and moving the terminal device 7.

As shown in FIG. 8(a), the cross button (direction-input button) 54A and the buttons 54B to 54H, of the operation buttons 54A to 54L, are provided on the front surface of the housing 50. That is, these buttons 54A to 54G are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

As shown in FIGS. 8(a), 8(b) and 8(c), the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface. The first R button 54J is provided at the right end of the upper side surface of the housing 50, and is exposed on the upper right side surface. Thus, the first L button 54I is provided at such a position that it can be operated with the left index finger of the user, and the first R button 54J is provided at such a position that it can be operated with the right index finger of the user (see FIG. 9).

As shown in FIGS. 8(b) and 8(c), a second L button 54K and a second R button 54L are arranged on leg portions 59A and 59B which are provided so as to project from the back surface (i.e., the surface opposite to the front surface on which the LCD 51 is provided) of the plate-like housing 50. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to generally correspond to a left analog stick 53A provided on the front surface, and the second R button 54L is provided on the reverse side so as to generally correspond to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). As shown in FIG. 8(c), the second L button 54K and the second R button 54L are provided on diagonally-upwardly-facing surfaces of the leg portions 59A and 59B and have diagonally-upwardly-facing button surfaces. It is believed that the middle fingers will move in the up/down direction when the user holds the terminal device 7, and it will be easier for the user to press the second L button 54K and the second R button 54L if the button surfaces are facing upward. With the provision of leg portions on the back surface of the housing 50, it is easier for the user to hold the housing 50, and with the provision of buttons on the leg portions, it is easier to operate the housing 50 while holding the housing 50.

With the terminal device 7 shown in FIG. 8, since the second L button 54K and the second R button 54L are provided on the back surface, if the terminal device 7 is put down with the screen of the LCD 51 (the front surface of the housing 50) facing up, the screen may not be completely horizontal. Therefore, in other embodiments, three or more leg portions may be formed on the back surface of the housing 50. Then, since it can be put down on the floor surface with the leg portions in contact with the floor surface in a state where the screen of the LCD 51 is facing up, the terminal device 7 can be put down so that the screen is horizontal. A removable leg portion may be added so that the terminal device 7 is put down horizontally.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc.

Although not shown, the terminal device 7 may include a button for turning ON/OFF the power of the terminal device 7. The terminal device 7 may also include a button for turning ON/OFF the screen display of the LCD 51, a button for performing a connection setting (pairing) with the game device 3, and a button for adjusting the sound volume of the speaker (the speaker 67 shown in FIG. 10).

As shown in FIG. 8(a), the terminal device 7 includes the marker section (the marker section 55 shown in FIG. 10) including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example.

The terminal device 7 includes a microphone (a microphone 79 shown in FIG. 10) as a sound input mechanism. A microphone hole 60 is provided on the front surface of the housing 50. The microphone 69 is provided inside the housing 50 behind the microphone hole 60. The microphone detects sounds around the terminal device 7 such as the voice of the user.

The terminal device 7 includes a speaker (the speaker 67 shown in FIG. 10) as a sound output mechanism. As shown in FIG. 8(d), speaker holes 57 are provided on the lower side surface of the housing 50. The output sounds from the speaker 67 are outputted from the speaker holes 57. In the present embodiment, the terminal device 7 includes two speakers, and the speaker holes 57 are provided at the respective positions of each of the left speaker and the right speaker.

The terminal device 7 includes an extension connector 58 via which another device can be connected to the terminal device 7. In the present embodiment, the extension connector 58 is provided on the lower side surface of the housing 50 as shown in FIG. 8(d). The other device connected to the extension connector 58 may be any device, and may be, for example, a game-specific controller (gun-shaped controller, etc.) or an input device such as a keyboard. The extension connector 58 may be omitted if no other device is connected to the terminal device 7.

With the terminal device 7 shown in FIG. 8, the shape of each operation button, the shape of the housing 50, the number and the positions of the components, etc., are merely illustrative, and the systems, methods, and techniques described herein may be implemented with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, and a battery 75. These electronic components are mounted on an electronic circuit board and accommodated in the housing 50.

The UI controller 65 is a circuit for controlling the input/output of data to/from various types of input/output sections. The UI controller 65 is connected to the touch panel controller 61, an analog stick 53 (the analog sticks 53A and 53B), an operation button 54 (the operation buttons 54A to 54L), the marker section 55, the magnetic sensor 62, the acceleration sensor 63, and the gyrosensor 64. The UI controller 65 is connected to the codec LSI 66 and the extension connector 58. The power supply IC 74 is connected to the UI controller 65, and power is supplied to various sections via the UI controller 65. The built-in battery 75 is connected to a power supply IC 74 to supply power. The charger 76 or a cable with which power can be obtained from an external power source via a connector, or the like, can be connected to the power supply IC 74, and the terminal device 7 can receive power supply from or be charged by an external power source using the charger 76 or the cable. The terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on signals from the touch panel 52, and outputs it to the UI controller 65. The touch position data represents, for example, the coordinates of a position on the input surface of the touch panel 52 at which an input is made. The touch panel controller 61 reads a signal from the touch panel 52 and generates touch position data at a rate of once per a predetermined amount of time. Various control instructions for the touch panel 52 are outputted from a UI controller 65 to the touch panel controller 61.

The analog stick 53 outputs, to the UI controller 65, stick data representing the direction and the amount of slide (or tilt) of the stick portion operated with a finger of the user. The operation button 54 outputs, to the UI controller 65, operation button data representing the input status of each of the operation buttons 54A to 54L (e.g., whether it is pressed).

The magnetic sensor 62 detects the azimuthal direction by sensing the size and direction of the magnetic field. Azimuthal direction data representing the detected azimuthal direction is outputted to the UI controller 65. Control instructions for a magnetic sensor 62 are outputted from the UI controller 65 to the magnetic sensor 62. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 62 may be any sensor as long as it is possible to detect the azimuthal direction. Strictly speaking, in a place where there is a magnetic field other than the geomagnetic field, the obtained azimuthal direction data does not represent the azimuthal direction.

The acceleration sensor 63 is provided inside the housing 50 for detecting the magnitude of the linear acceleration along each of the directions of the three axes (the x, y and z axes shown in FIG. 8(*a*)). Specifically, an acceleration sensor 63 detects the magnitude of the linear acceleration along each of the axes, where the x axis lies in the longitudinal direction of the housing 50, the y axis lies in the width direction of the housing 50, and the z axis lies in the direction vertical to the surface of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x-axis, the y-axis and the z-axis. Angular velocity data representing the detected angular velocities is outputted to the UI controller 65. Control instructions for a gyrosensor 64 are outputted from the UI controller 65 to the gyrosensor 64. The number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The UI controller 65 outputs, to the codec LSI 66, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 executes a minimal program for the management thereof and for the communication. When the terminal device 7 is started up, a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 66. Control instructions for the camera 56, such as an image-capturing instruction, are outputted from the codec LSI 66 to the camera 56. Camera 56 can also record video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs sound signals obtained by performing D/A conversion on the sound data to the speaker 67 so that sound is outputted from the speaker 67. The microphone 69 detects sounds propagated to the terminal device 7 (the sound of the user, etc.), and outputs sound signals representing such sounds to the sound IC 68. The sound IC 68 performs A/D conversion on the sound signals from the microphone 69 to output sound data of a predetermined format to the codec LSI 66.

The codec LSI 66 transmits, as terminal operation data, image data from the camera 56, sound data from the microphone 69 and operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 72 performs infrared communication in accordance with the IRDA standard, for example, with another device. The codec LSI 66 may transmit, to the game device 3, data received via infrared communication while it is included in the transmit data as necessary.

As described above, compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in data received from the game device 3, the codec LSI 66 and the UI controller 65 give control instructions to various sections in accordance with the control data. As described above, the control data is data representing control instructions for the components of the terminal device 7 (the camera 56, the touch panel controller 61, the marker section 55, sensors 62 to 64, and the infrared communication module 72 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 62, the acceleration sensor 63 and the gyrosensor 64 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Outline of Game Process]

Next, an outline of a game process to be performed in the game system 1 of the present embodiment will be explained. The game to be performed by the present game process is a shooting game in which a plurality of players play against each other using a terminal device 7 and a plurality of controllers 5 as controller devices. The present embodiment is directed to a case where the game system 1 includes four controllers 5, and the four controllers 5 are used. That is, in the present embodiment, the game is played by a total of five players including one player operating the terminal device 7 and four players operating the four controllers 5. In other embodiments, the number of the controllers 5 may be any number.

Figure 11:
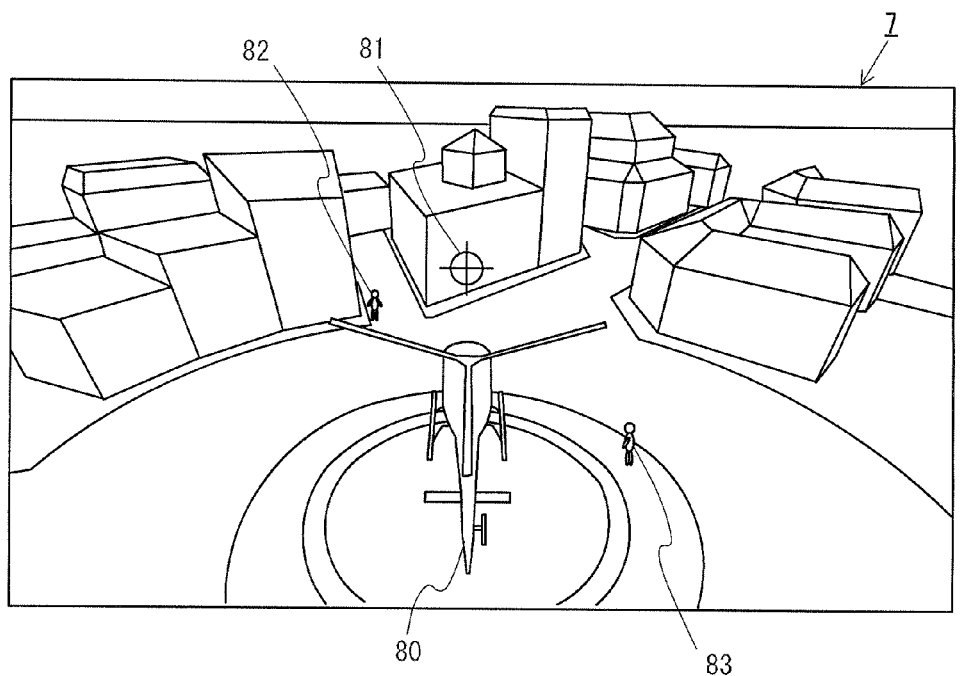
FIG. 11 is a diagram showing an example terminal game image of the present embodiment.

FIG. 11 is a diagram showing an example terminal game image of the present embodiment. As shown in FIG. 11, an image of a virtual game space including a helicopter object (hereinafter referred to simply as a "helicopter") 80 and an image of a cursor 81 are displayed on the terminal device 7 as the terminal game image. Depending on the situation, an object resembling a player (referred to as the "player object"), which is the object to be controlled by the controller 5, may be displayed. The action of the helicopter 80 is controlled in accordance with operations on the terminal device 7. In the present embodiment, the helicopter 80 can move in every three-dimensional direction in the game space. Specifically, the helicopter 80 can move (translate) in the forward-backward direction, the left-right direction and the up-down direction, and can also rotate in the yaw direction (the rotation direction about an axis extending in the up-down direction) and in the roll direction (the rotation direction about an axis extending in the forward-backward direction). Depending on the game, only the rotation in the yaw direction may be used and the rotation in the roll direction may not be used. The player controlling the terminal device 7 can have the helicopter 80 execute a shooting action. That is, the helicopter 80 executes an action of shooting a bullet aiming at the position indicated by the cursor 81 in response to a predetermined shooting operation (e.g., an operation of pressing the first L button 54I or the first R button 54J).

Figure 12:
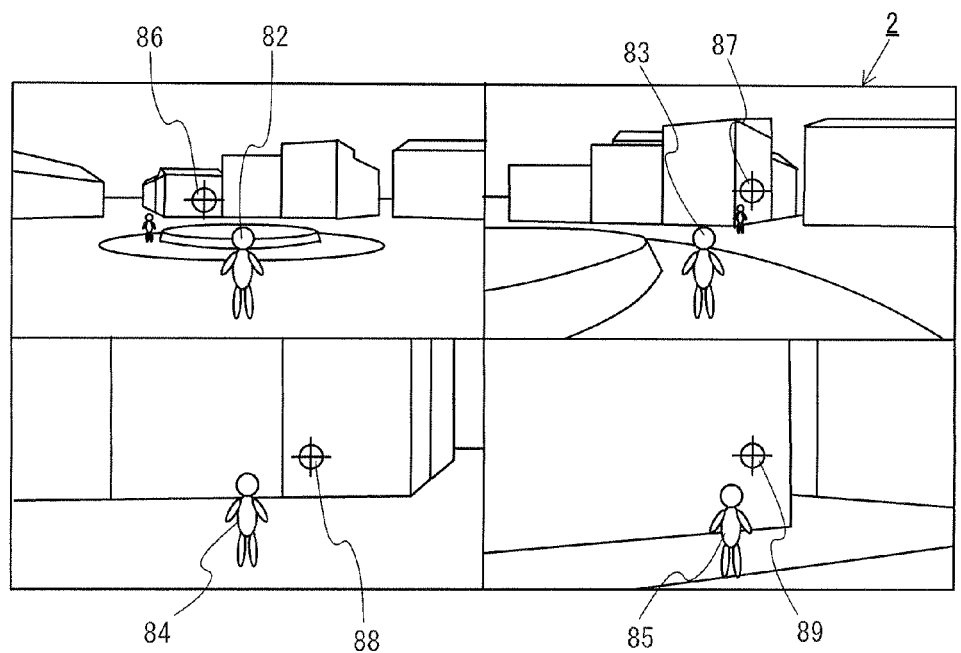
FIG. 12 is a diagram showing an example television game image of the present embodiment.

FIG. 12 is a diagram showing an example television game image of the present embodiment. As shown in FIG. 12, the television game image is divided into a number of areas equal to the number of the controllers 5 (in other words, the number of players using the controllers 5: four in the illustrated example). The image of the game space including the player object, which is the object to be controlled by the controller 5, and the cursor are included in each of the areas. In FIG. 12, player objects 82 to 85, which are objects corresponding to the controllers 5, are displayed in the four areas, and cursors 86 to 89 are displayed in the four areas. Depending on the situation, one area may display a player object or a helicopter 80 that corresponds to another area. The player can operate the controller 5 so that the player object moves on the ground or executes a shooting action aiming at the position indicated by the cursor.

The player who operates the terminal device 7 operates the terminal device 7 so as to shoot a player object while moving the helicopter 80. On the other hand, the players who operate the controllers 5 operate the controllers 5 so as to shoot the helicopter 80 while moving the player objects 82 to 85. Thus, this game is a shooting game in which the helicopter 80 and the player objects 82 to 85 play against each other by shooting each other.

Operations on the terminal device 7 will now be described in detail. First, referring to FIGS. 13 and 14, a method for controlling the helicopter 80 using the terminal device 7 will be described. In the present embodiment, the helicopter 80 is controlled by operations on two analog sticks 53 provided on the terminal device 7. Specifically, the movement (translation) and the rotation in the yaw direction of the helicopter 80 are controlled.

Figure 13:
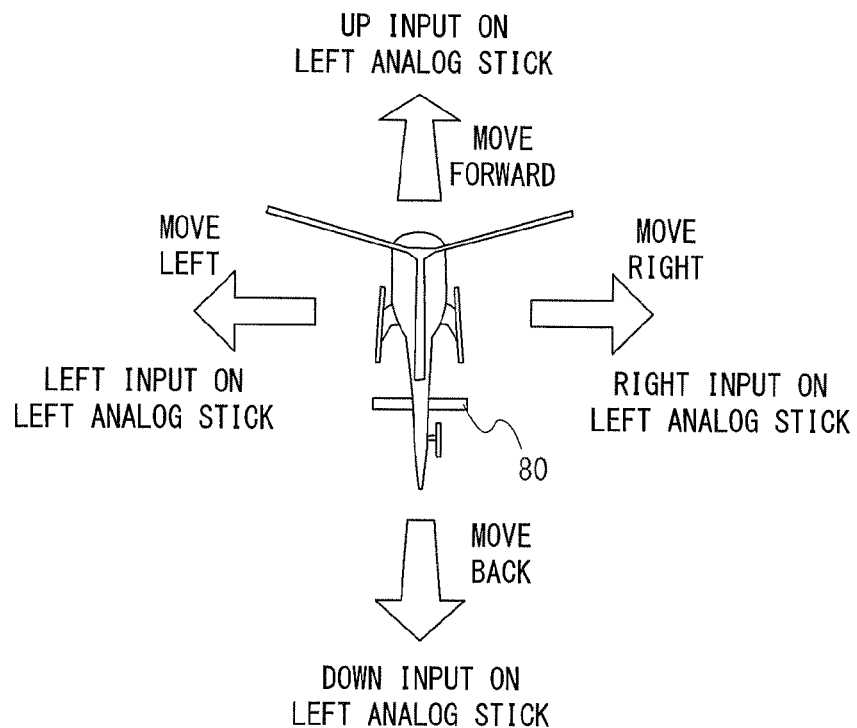
FIG. 13 is a diagram showing an example correspondence between operations on a left analog stick 53A and actions of a helicopter 80.

FIG. 13 is a diagram showing a correspondence between operations on the left analog stick 53A and actions of the helicopter 80. As shown in FIG. 13, the helicopter 80 translates (moves) forward in response to an UP input on the left analog stick 53A, and the helicopter 80 translates (moves) backward in response to a DOWN input on the left analog stick 53A. The helicopter 80 translates leftward in response to a LEFT input on the left analog stick 53A, and the helicopter 80 translates rightward in response to a RIGHT input on the left analog stick 53A.

Figure 14:
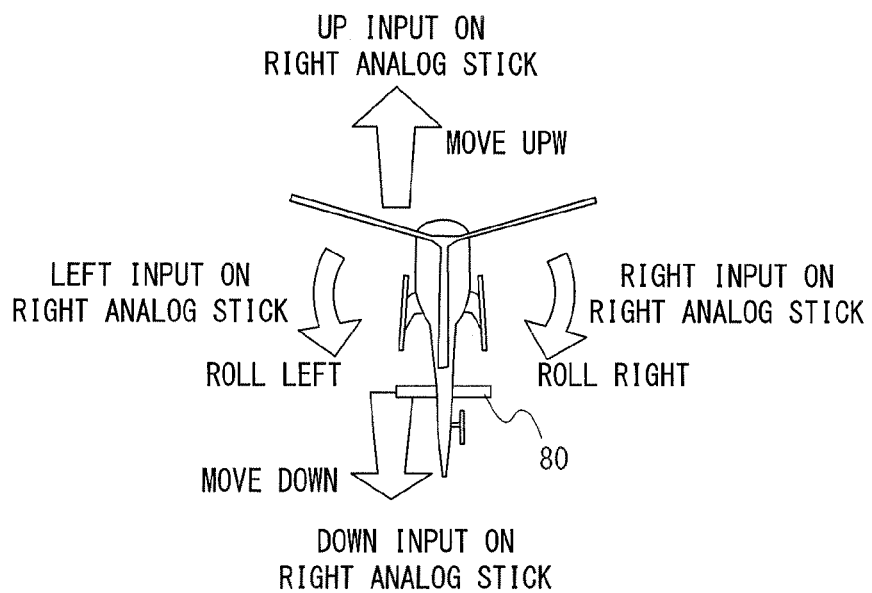
FIG. 14 is a diagram showing an example correspondence between operations on the right analog stick 53B and actions of the helicopter 80.

FIG. 14 is a diagram showing a correspondence between operations on the right analog stick 53B and actions of the helicopter 80. As shown in FIG. 14, the helicopter 80 moves upward in response to an UP input on the right analog stick 53B, and the helicopter 80 moves downward in response to a DOWN input on the right analog stick 53B. The helicopter 80 rolls leftward in response to a LEFT input on the right analog stick 53B, and the helicopter 80 rolls rightward in response to a RIGHT input on the right analog stick 53B.

As described above, in the present embodiment, the player can three-dimensionally move the helicopter 80 by direction input operations on the two analog sticks 53. In the present embodiment, the position and the attitude of the helicopter 80 are changed also by rotating the terminal device 7 in the yaw direction, the details of which will be described later. The attitude of the helicopter 80 may be further changed by the rotation in the pitch direction. Herein, the roll direction, the yaw direction and the pitch direction of the terminal device 7 refer to the rotation direction about the z axis, the rotation direction about the y axis, and the rotation direction about the x axis, respectively, of the terminal device 7 in a state where an axis (the z axis shown in FIG. 8) perpendicular to the screen of the terminal device 7 (the LCD 51) extends in a predetermined direction parallel to the horizontal direction.

Next, referring to FIG. 15, a method for controlling the viewpoint of the terminal game image displayed on the terminal device 7, i.e., a method for controlling the virtual camera for generating the terminal game image, will be described. In the present embodiment, the virtual camera is controlled based on the attitude of the terminal device 7. Specifically, the attitude of the virtual camera is controlled so as to be an attitude according to the attitude of the terminal device 7 in the real space, and the position of the virtual camera is controlled so that the helicopter 80 is included in the viewing field range (image-capturing range) of the virtual camera.

Figure 15:
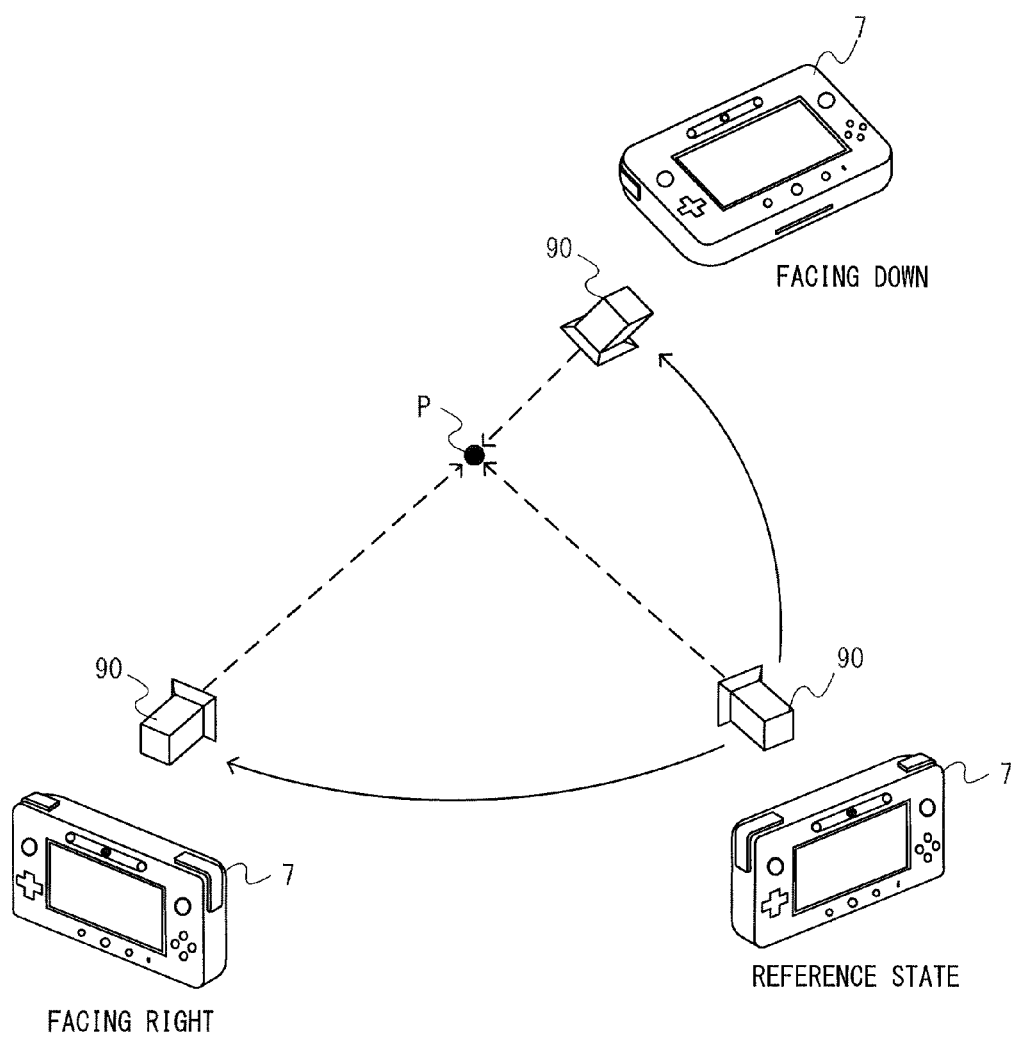
FIG. 15 is a diagram showing an example correspondence between the attitude of the terminal device 7 and the attitude of a virtual camera 90.

FIG. 15 is a diagram showing a correspondence between the attitude of the terminal device 7 and the attitude of the virtual camera. In FIG. 15, the virtual camera 90 assumes a predetermined reference attitude that is parallel to the horizontal direction in the virtual space in a predetermined reference state where the z axis of the terminal device 7 is parallel to the horizontal direction. Herein, the virtual camera 90 is controlled so as to be in an attitude obtained by rotating the reference attitude of the virtual camera 90 in a direction in which the terminal device 7 is rotated from the reference state by an amount according to the amount by which the terminal device 7 is rotated. For example, when the terminal device 7 is rotated (in the yaw direction) so that it is turned rightward from the reference attitude, the virtual camera 90 rotates (in the yaw direction) so that it is turned rightward from the reference attitude. When the terminal device 7 is rotated (in the pitch direction) so that it is turned downward from the reference attitude, the virtual camera 90 rotates (in the pitch direction) so that it is turned downward from the reference attitude. Although not shown in the figures, when the terminal device 7 is rotated (in the roll direction) about an axis perpendicular to the screen from the reference attitude, the virtual camera 90 rotates (in the roll direction) about an axis extending in the viewing direction. Thus, in the present embodiment, a control is performed so that the attitude of the terminal device 7 in the real space corresponds to the attitude of the virtual camera 90 in the virtual game space. Therefore, the player can change the viewing direction of the terminal game image by an easy and intuitive operation using the terminal device 7.

The position of the virtual camera 90 is controlled so that the helicopter 80 is included in the viewing field range. Specifically, the virtual camera 90 is set at a position that is at a predetermined distance from the position P of the helicopter 80 while facing that position P. Therefore, when the terminal device 7 is rotated so as to turn rightward from the reference attitude, the virtual camera 90 is moved leftward from the reference attitude, and when the terminal device 7 is rotated so as to turn downward from the reference attitude, the virtual camera 90 is moved upward from the reference attitude (see FIG. 15). In other embodiments, the virtual camera 90 may be set at a position of the helicopter 80. That is, a so-called "first-person perspective" game image may be displayed on the terminal device 7. There may be cases where the distance between the virtual camera 90 and the helicopter 80 varies depending on the status of the game.

As described above, in the present embodiment, it is possible to three-dimensionally move the helicopter 80 by an operation on the two analog sticks 53 of the terminal device 7 and an operation of changing the attitude of the terminal device 7 itself, and it is possible to three-dimensionally change the viewing direction (the virtual camera 90) for viewing the helicopter 80. That is, in the present embodiment, it is possible to easily give input commands for a plurality of directions (a command for moving/rotating the helicopter 80 and the virtual camera 90) by intuitive operations using the terminal device 7, and it is possible to improve the controllability in giving input commands for a plurality of directions.

In the present embodiment, the helicopter 80 and the virtual camera 90 are controlled as follows so as to make the operation easier for the player.

In the present embodiment, when the helicopter 80 is rotated in the yaw direction (the rotation direction about an axis perpendicular to the game space) by an input in the left-right direction on the right analog stick 53B, the virtual camera 90 is controlled so as to turn in the same direction as the helicopter 80 for the yaw direction. That is, for the yaw direction, when the attitude of the helicopter 80 changes by an input on the right analog stick 53B, the attitude of the virtual camera 90 changes so as to be matched with the helicopter 80. The reason for this is that for the yaw direction, the player may feel awkward about the control of the helicopter 80 if the direction of the helicopter 80 is not matched with the direction of the virtual camera 90. Specifically, in the present embodiment, the helicopter 80 moves in the forward-backward direction with respect to the helicopter 80 depending on the input in the up-down direction on the left analog stick 53A. Therefore, if the direction of the helicopter 80 and the direction of the virtual camera 90 are not matched with each other for the yaw direction, the helicopter 80 moves in a direction different from the screen depth direction in response to an input in the up-down direction. Thus, in a case in which an input in the up-down direction does not correspond to the screen depth direction, the player may feel awkward. If the attitude of the virtual camera 90 is changed in response to the rotation of the helicopter 80 triggered by an operation on the right analog stick 53B, the correspondence between the attitude of the terminal device 7 in the real space and the attitude of the virtual camera 90 in the virtual space changes. However, it is believed that for the yaw direction (left-right direction), the user will not feel awkward even if the correspondence changes. For the above reason, in the present embodiment, the attitude of the helicopter 80 and the attitude of the virtual camera 90 are matched with each other for the yaw direction. Note however that the attitude of the helicopter 80 and the attitude of the virtual camera 90 do not always have to match completely with each other, as long as the attitude of the helicopter 80 is made to follow the attitude of the virtual camera 90 so that the user does not feel awkward.

Moreover, in the present embodiment, when the attitude of the virtual camera 90 changes by changing the attitude of the terminal device 7 for the yaw direction, the attitude of the helicopter 80 is controlled so as to match with the attitude of the virtual camera 90 for the yaw direction. Herein, the player can rotate the terminal device 7 at a free velocity, and can change the attitude of the terminal device 7 relatively fast, and therefore the attitude of the virtual camera 90 may change relatively fast in accordance with the attitude of the terminal device 7. However, if the attitude of the helicopter 80 is changed fast in accordance with the change in the attitude of the virtual camera 90, the action of the helicopter 80 may become unnatural. In the present embodiment, where the attitude of the virtual camera 90 changes as the attitude of the terminal device 7 changes, the attitude of the helicopter 80 is controlled to change gradually, following (with a slight delay from) the attitude of the virtual camera 90. Then, if there is an input in the left-right direction on the right analog stick 53B, the game device 3 may further change the attitude of the helicopter 80.

Figure 16:
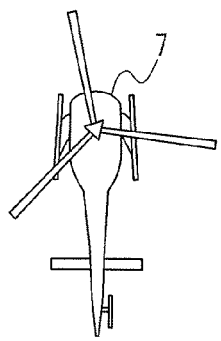
FIG. 16 is a diagram showing an example of how the attitude of the helicopter 80 changes gradually, following a change in the attitude of the virtual camera 90.
Figure 16:
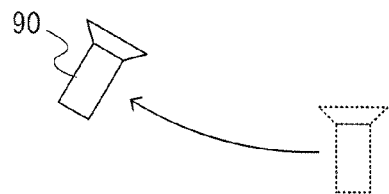
Figure 17:
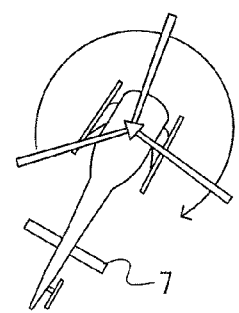
FIG. 17 is a diagram showing an example of how the attitude of the helicopter 80 changes gradually, following a change in the attitude of the virtual camera 90.
Figure 17:
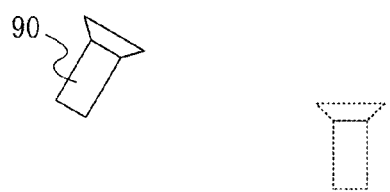

FIGS. 16 and 17 are diagrams showing how the attitude of the helicopter 80 changes gradually, following the change of the attitude of the virtual camera 90. When the attitude of the terminal device 7 changes, the attitude (and the position) of the virtual camera 90 changes in accordance with the change of the attitude of the terminal device 7, as shown in FIG. 16. In this case, as shown in FIG. 17, the attitude of the helicopter 80 changes gradually, so as to follow the attitude of the virtual camera 90 at a rotation velocity that is less than or equal to a predetermined velocity, and eventually becomes equal to the attitude of the virtual camera 90 (see the arrow shown in FIG. 17). As described above, when the attitude of the virtual camera 90 changes, the attitude of the helicopter 80 changes with a delay from the attitude of the virtual camera 90. Thus, it is possible to prevent the attitude of the helicopter 80 from changing abruptly in response to a change in the attitude of the terminal device 7, thereby allowing the helicopter 80 to act in a natural manner.

[6. Details of Game Processes]

Figure 18:
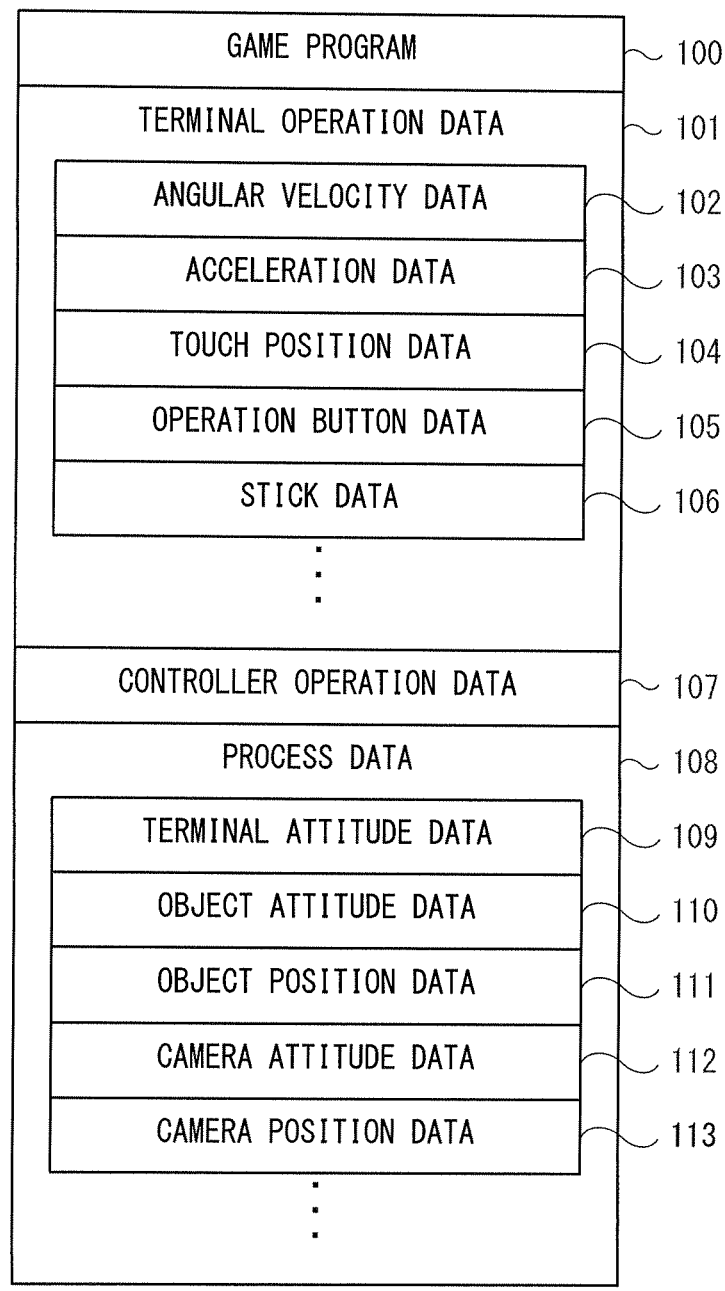
FIG. 18 is a diagram showing example various data used in a game process.

Next, the details of game processes performed by the present game system will be described. First, various data used in the game processes will be described. FIG. 18 is a diagram showing various data used in the game processes. FIG. 18 is a diagram showing primary data to be stored in the main memory (the external main memory 12 or the internal main memory 11e) of the game device 3. As shown in FIG. 18, the main memory of the game device 3 stores a game program 100, terminal operation data 101, controller operation data 107, and process data 108. In addition to those shown in FIG. 18, the main memory also stores other data used in the game, such as image data of various objects appearing in the game, and sound data used in the game, etc.

At an appropriate point in time after the power of the game device 3 is turned ON, a part or whole of the game program 100 is loaded from the optical disc 4 and stored in the main memory. The game program 100 may be obtained from the flash memory 17 or an external device of the game device 3 (e.g., via the Internet), instead of from the optical disc 4. A part of the game program 100 (e.g., a program for calculating the attitude of the controller 5 and/or the terminal device 7) may be pre-stored in the game device 3.

The terminal operation data 101 is data representing an operation performed by a player on the terminal device 7. The terminal operation data 101 is transmitted from the terminal device 7, obtained by the game device 3, and stored in the main memory. The terminal operation data 101 includes angular velocity data 102, acceleration data 103, touch position data 104, operation button data 105, and stick data 106. The main memory may store a predetermined number of latest (most recently obtained) sets of terminal operation data.

The angular velocity data 102 is data representing the angular velocity detected by the gyrosensor 64. While the angular velocity data 102 represents angular velocity about each of the three axes of x, y and z shown in FIG. 8 in the present embodiment, it may represent angular velocity about any one or more axes in other embodiments.

The acceleration data 103 is data representing the acceleration (acceleration vector) detected by the acceleration sensor 63. While the acceleration data 103 represents three-dimensional acceleration of which each component is the acceleration for one of the three axes of x, y and z shown in FIG. 8, it may represent acceleration for any one or more directions in other embodiments.

The touch position data 104 is data representing the position (touch position) on the input surface of the touch panel 52 at which an input is made. In the present embodiment, the touch position data 104 represents the coordinate values in the two-dimensional coordinate system which is for representing positions on the input surface. Where the touch panel 52 is of a multi-touch type, the touch position data 104 may represent a plurality of touch positions.

The operation button data 105 is data representing the input status on depressible key operation sections (the operation buttons 54A to 54L) provided on the terminal device 7. Specifically, the operation button data 105 represents whether each of the operation buttons 54A to 54L is being pressed.

The stick data 106 is data representing the direction and amount by which the stick portion of each of the analog sticks 53A and 53B is slid (or tilted). The analog stick 53 is an input device through which an input can be made by moving an operation member (stick portion) which can be moved in any two-dimensional direction, and the stick data 106 represents the direction (the operation direction) and the amount (operation amount) by which the operation member is operated. In the present embodiment, it is assumed that the operation amount and the operation direction of the analog stick 53 are represented by two-dimensional coordinates of which the x component is the operation amount for the left-right direction and the y component is the operation amount for the up-down direction.

In addition to the data 102 to 105, the terminal operation data 101 may include azimuthal direction data representing the azimuthal direction detected by the magnetic sensor 62. In the present embodiment, camera image data and/or microphone sound data, as well as the terminal operation data 101, may be transmitted from the terminal device 7 to the game device 3. The camera image data is data representing an image (camera image) captured by the camera 56 of the terminal device 7. The microphone sound data is data representing sound (microphone sound) detected by the microphone 69 of the terminal device 7. The camera image data and the microphone sound data are compressed by the codec LSI 66 and transmitted to the game device 3, and are expanded by the codec LSI 27 of the game device 3 and stored in the main memory.

The terminal operation data 101 at least includes data representing a direction-specifying input and data representing a physical quantity used for calculating the attitude of the terminal device 7. While the "data representing a direction-specifying input" is the stick data 106 in the present embodiment, it may be data representing an input on the cross button 54A or data representing an input on the four buttons 54E to 54H. While the data representing a physical quantity is the acceleration data 103, the angular velocity data 102 and azimuthal direction data in the present embodiment, the terminal operation data 101 may be data that includes any one or two of these three data in other embodiments. In a case in which the terminal device 7 includes another input mechanism (e.g., a touch pad, or an image-capturing mechanism of the controller 5, etc.), the terminal operation data 101 may include data which is output from the other input mechanism.

The controller operation data 107 is data representing a user (player) operation on the controller 5. The controller operation data 107 is transmitted from the controller 5, obtained by the game device 3, and stored in the main memory. As described above, the controller operation data 107 includes data representing the detection results of the acceleration sensor 37 and the gyrosensor 48, data representing the input status of the operation buttons 32a to 32i, and data representing the marker coordinates. In the present embodiment, four controller operation data 107 transmitted from the four controllers 5, respectively, are stored in the main memory. The main memory may store a predetermined number of latest (most recently obtained) sets of controller operation data for each of the four controllers 5.

As long as the controller operation data 107 represents the operation of the user operating the controller 5, it may include only some of the data. In a case in which the controller 5 includes another input mechanism (e.g., a touch panel, an analog stick, or the like), the controller operation data 107 may include data representing the operation on the other input mechanism.

Figure 19:
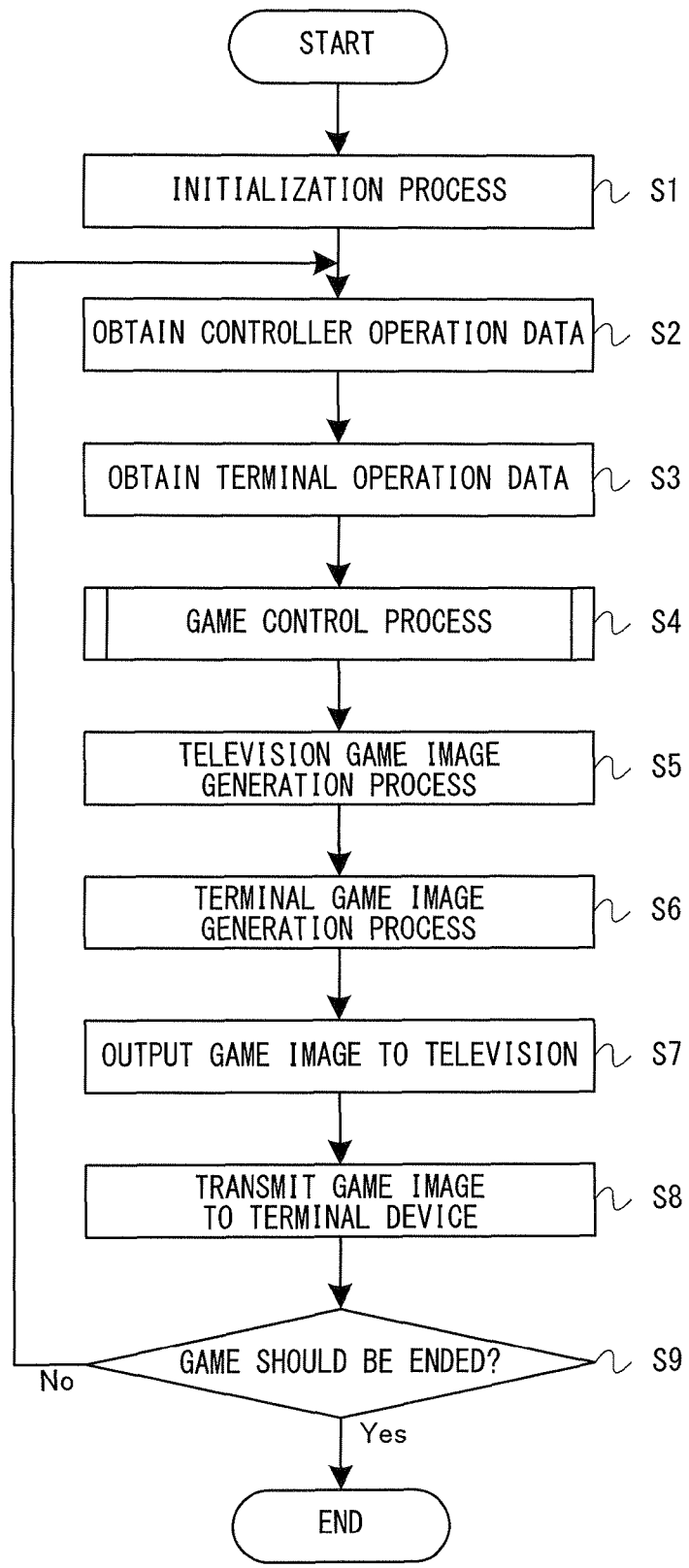
FIG. 19 is a main flow chart showing an example flow of a game process performed by the game device 3.

The process data 108 is data used in game processes to be described below (FIG. 19). The process data 108 includes terminal attitude data 109, object attitude data 110, object position data 111, camera attitude data 112, and camera position data 113. In addition to the data shown in FIG. 18, the process data 108 includes various data used in game processes such as data representing various parameters set for various objects appearing in the game.

The terminal attitude data 109 is data representing the attitude of the terminal device 7. For example, the attitude of the terminal device 7 may be expressed by a rotation matrix that represents the rotation from a predetermined reference attitude to the current attitude of the terminal device 7, or may be expressed by a third-order vector or three angles. While the attitude in the three-dimensional space is used as the attitude of the terminal device 7 in the present embodiment, the attitude in the two-dimensional plane may be used in other embodiments. In the present embodiment, the terminal attitude data 109 is calculated based on the acceleration data 103 and the angular velocity data 102 included in the terminal operation data. The method for calculating the terminal attitude data 109 will be later described in step S11.

The object attitude data 110 is data representing the attitude of the helicopter 80 in the virtual game space. The object position data 111 is data representing the position of the helicopter 80 in the virtual game space. The object attitude data 110 and the object position data 111 are calculated based on the stick data 106 and the terminal attitude data 109, the details of which will be described later in step S12.

The camera attitude data 112 is data representing the attitude of the virtual camera 90 in the virtual game space. The camera position data 113 is data representing the position of the virtual camera 90 in the virtual game space. The camera attitude data 112 and the camera position data 113 are calculated based on the stick data 106 and the terminal attitude data 109, the details of which will be described later in step S13.

The attitudes of the helicopter 80 and the virtual camera 90 may be for example expressed by a rotation matrix, or may be expressed by a third-order vector or three angles. The positions of the helicopter 80 and the virtual camera 90 are expressed by coordinate values in the three-dimensional coordinate system for representing positions in the game space.

Next, the details of the game processes performed by the game device 3 will be described with reference to FIGS. 19 to 23. FIG. 19 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program immediately after power-up, or it may be configured so that a built-in program is executed after power-up for displaying a predetermined menu screen first, and then the game program is executed in response to a user's instruction to start the game. The flow chart shown in FIG. 19 is a flow chart showing the process to be performed after processes described above are completed.

The processes of the steps of the flow chart shown in FIGS. 19 to 23 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. In the present embodiment, data representing the initial position and the initial attitude of the helicopter 80 is stored as the object position data 111 and the object attitude data 110, respectively, in the main memory in the initialization process. The initial position and the initial attitude of the virtual camera 90 are set so that the virtual camera 90 is at a predetermined distance from the position of the helicopter 80 while facing that position. The data representing the initial position and the initial attitude of the virtual camera 90 are stored as the camera position data 113 and the camera attitude data 112, respectively, in the main memory. The process of step S2 is performed, following step S1. Thereafter, the process loop including a series of processes of steps S2 to S9 is repeatedly performed at a rate of once per a predetermined amount of time (a one frame period).

In step S2, the CPU 10 obtains controller operation data transmitted from the four controllers 5. As each controller 5 repeatedly transmits controller operation data to the game device 3, the controller communication module 19 of the game device 3 successively receives the controller operation data, and the received controller operation data is successively stored in the main memory by the input/output processor 11a. The transmission/reception interval may be shorter than the game process time, and is $1/200$ sec, for example. In step S2, the CPU 10 reads out the latest controller operation data 107 from the main memory. The process of step S3 is performed, following step S2.

In step S3, the CPU 10 obtains the terminal operation data transmitted from the terminal device 7. As the terminal device 7 repeatedly transmits the terminal operation data to the game device 3, the game device 3 successively receives the terminal operation data. In the game device 3, the terminal communication module 28 successively receives the terminal operation data, and the input/output processor 11a successively stores the terminal operation data in the main memory. In step S3, the CPU 10 reads out the latest terminal operation data 101 from the main memory. The process of step S4 is performed, following step S3.

In step S4, the CPU 10 performs the game control process. The game control process allows the game to progress by performing processes of moving objects in the game space, for example, in response to game operations by the player.

Specifically, the process of controlling the helicopter 80 and the virtual camera 90, the process of controlling the player object, etc., are performed in the game control process of the present embodiment. The details of the game control process will now be described with reference to FIG. 20.

Figure 20:
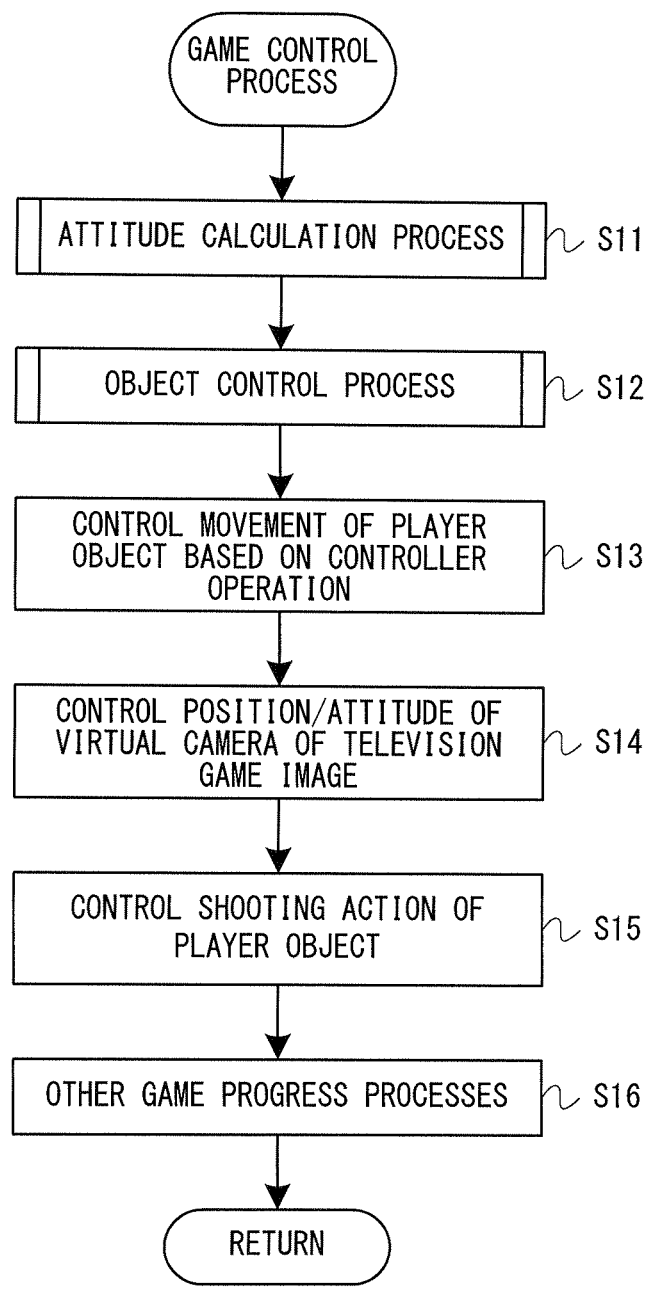
FIG. 20 is a flow chart showing an example detailed flow of a game control process (step S4) shown in FIG. 19.

FIG. 20 is a flow chart showing a detailed flow of the game control process (step S4) shown in FIG. 19. In the game control process, in step S11, the CPU 10 performs the attitude calculation process. The attitude calculation process is a process of calculating the attitude of the terminal device 7 based on the terminal operation data 101. The details of the attitude calculation process will now be described with reference to FIG. 21.

Figure 21:
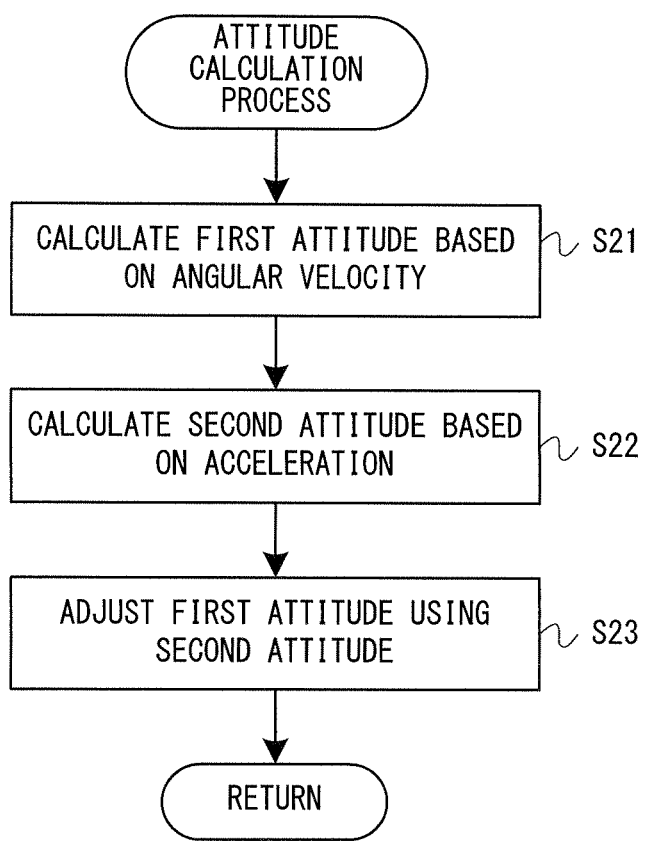
FIG. 21 is a flow chart showing an example detailed flow of an attitude calculation process (step S11) shown in FIG. 20.

FIG. 21 is a flow chart showing a detailed flow of the attitude calculation process (step S11) shown in FIG. 20. First, in the attitude calculation process, in step S21, the CPU 10 calculates the attitude of the terminal device 7 (referred to as the "first attitude") based on the angular velocity data 102. While the method for calculating the first attitude based on an angular velocity may be any method, the first attitude is calculated based on the previous attitude (the attitude calculated in a previous iteration) and the current angular velocity (the angular velocity obtained in step S3 in a current iteration of the process loop). Specifically, the CPU 10 calculates the attitude by rotating the previous attitude by a unit time's worth of the current angular velocity. The previous first attitude is represented by the terminal attitude data 109 stored in the main memory, and the current angular velocity is represented by the angular velocity data 102 stored in the main memory. Therefore, the CPU 10 reads out the terminal attitude data 109 and the angular velocity data 102 from the main memory to calculate the attitude of the terminal device 7. The data representing the "attitude based on the angular velocity" calculated as described above is stored in main memory. The process of step S22 is performed, following step S21.

Where the attitude is calculated from the angular velocity in step S21, an initial attitude may be set. That is, where the attitude of the terminal device 7 is calculated from the angular velocity, the CPU 10 initially sets the initial attitude of the terminal device 7. The initial attitude of the terminal device 7 may be calculated based on the acceleration data, or the player may be prompted to perform a predetermined operation with the terminal device 7 in a particular attitude so that the particular attitude at the point in time when the predetermined operation is performed is set as the initial attitude. While the initial attitude may be calculated in a case in which the attitude of the terminal device 7 is calculated as an absolute attitude with respect to a predetermined direction in the space, the initial attitude may not be calculated in a case in which the attitude of the terminal device 7 is calculated as a relative attitude with respect to the attitude of the terminal device 7 at the start of the game, for example.

In step S22, the CPU 10 calculates the attitude of the terminal device 7 (referred to as the "second attitude") based on the acceleration of the terminal device 7. Specifically, the CPU 10 reads out the acceleration data 103 from the main memory, and calculates the second attitude based on the acceleration data 103. In a state in which the terminal device 7 is substantially stationary, the acceleration acting upon the terminal device 7 means the gravitational acceleration. Therefore, in this state, the direction (attitude) of the terminal device 7 with respect to the direction of the gravitational acceleration detected (direction of gravity) can be calculated based on the acceleration data 103. Thus, in a state in which the acceleration sensor 37 detects the gravitational acceleration, the second attitude can be calculated based on the acceleration data 103. Data representing the second attitude calculated as described above is stored in the main memory. The process of step S23 is performed, following step S22.

In step S23, the CPU 10 adjusts the first attitude based on the angular velocity using the second attitude based on the acceleration. Specifically, the CPU 10 reads out the data representing the attitudes from the main memory and makes an adjustment such that the first attitude is brought closer to the second attitude at a predetermined rate. The predetermined rate may be a predetermined fixed value or may be set based on the detected acceleration, etc. For example, the CPU 10 may increase the rate at which the first attitude is brought closer to the second attitude when the magnitude of the detected acceleration is close to the magnitude of the gravitational acceleration, and decrease the rate when the magnitude of the detected acceleration is remote from the magnitude of the gravitational acceleration. Since the correction is such a correction that the first attitude is brought closer to the attitude represented by the gravitational acceleration, the correction may be done without calculating and storing the second attitude, and the first attitude may be rotated simply so that the downward direction represented by the first attitude is brought closer to the acceleration vector. For the attitude based on the acceleration, since the attitude cannot be calculated for the rotation direction about the axis along the direction of gravity, the CPU 10 may not make the adjustment for the rotation direction.

In the present embodiment, data representing the attitude which has been corrected by the process of step S23 is stored in the main memory as the terminal attitude data 109. After step S23, the CPU 10 ends the attitude calculation process. The process of step S12 is performed, following the attitude calculation process of step S11.

The CPU 10 can know a predetermined azimuthal direction with respect to the terminal device 7 (i.e., the attitude of the terminal device 7 with respect to a predetermined azimuthal direction), from the azimuthal direction data detected by the magnetic sensor 62. Therefore, in other embodiments, the CPU 10 may calculate the attitude of the terminal device 7 by further using the azimuthal direction data, in addition to the angular velocity data 102 and the acceleration data 103. In a case in which the attitude of the terminal device 7 is calculated using the azimuthal direction data, it is possible to calculate the absolute attitude with respect to a predetermined direction in the real space, and it is therefore possible to more accurately calculate the attitude of the terminal device 7. Regarding the azimuthal direction data, in a place where there is a magnetic field other than the geomagnetic field, the azimuthal direction data does not strictly represent the absolute azimuthal direction (e.g., north). Nevertheless, since it represents the relative direction of the terminal device 7, it is still possible to calculate the attitude of the terminal device 7. In other embodiments, the attitude may be calculated based on one or two of the three data described above.

In step S12, the CPU 10 performs an object control process. The object control process is a process of controlling the action of the helicopter 80 based on operations on the terminal device 7 and setting the virtual camera 90. The details of the object control process will now be described with reference to FIG. 22.

Figure 22:
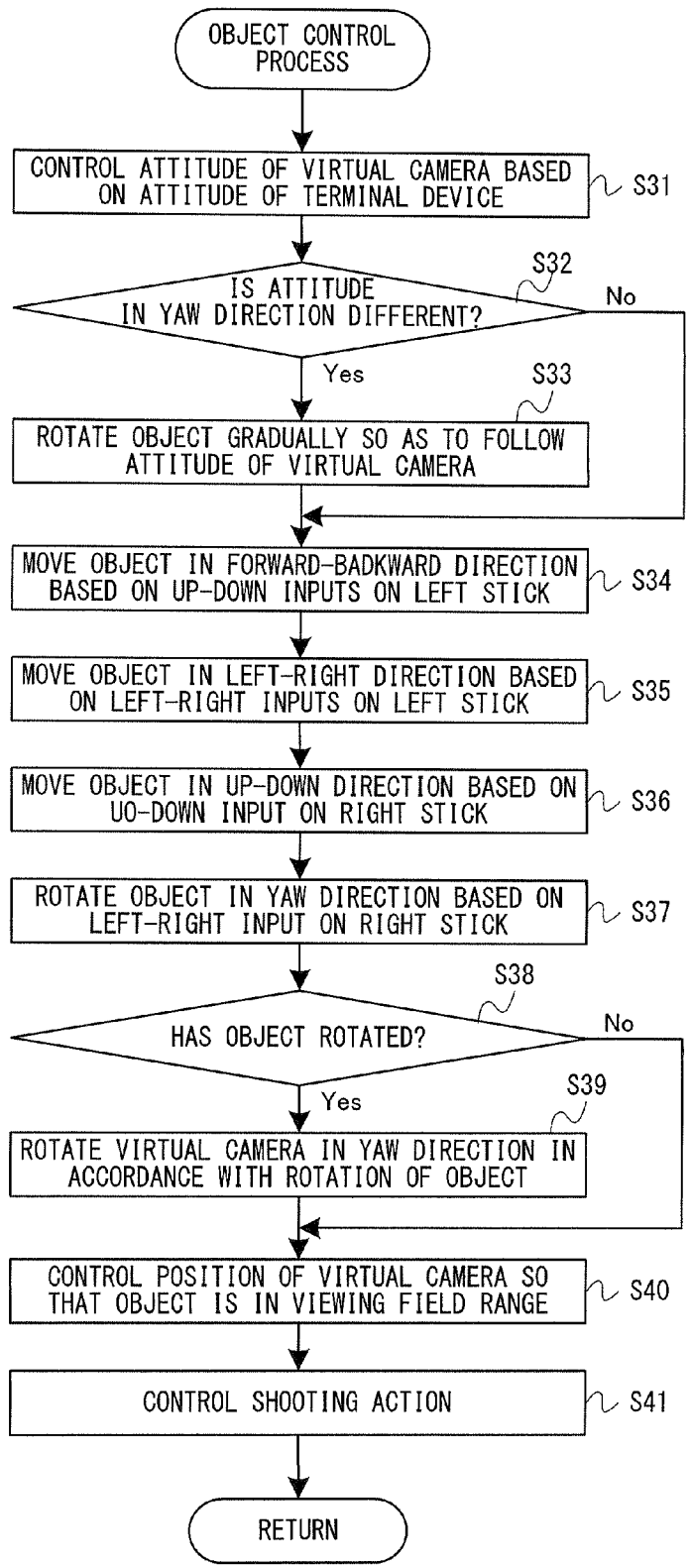
FIG. 22 is a flow chart showing an example detailed flow of an object control process (step S12) shown in FIG. 20.

FIG. 22 is a flow chart showing a detailed flow of the object control process (step S12) shown in FIG. 20. First, in the object control process, in step S31, the CPU 10 controls the attitude of the virtual camera 90 based on the attitude of the terminal device 7 calculated in step S11. Although the method for controlling the attitude of the virtual camera 90 may be any method as long as the attitude of the virtual camera 90 changes based on the attitude of the terminal device 7, the attitude of the virtual camera 90 is controlled so as to correspond to the attitude of the terminal device 7 in the real space in the present embodiment (see FIG. 15). Specifically, when the attitude of the terminal device 7 has changed from a certain state, the virtual camera 90 is rotated, from the attitude of the virtual camera 90 in that certain state, in a direction determined based on the direction in which the terminal device 7 has changed, and by an amount determined based on the amount by which the terminal device 7 has changed. As a specific process of step S31, the CPU 10 reads out the terminal attitude data 109 from the main memory, and calculates the attitude of the virtual camera 90 based on the attitude of the terminal device 7. Then, data representing the calculated attitude is stored in the main memory as new camera attitude data 112. The process of step S32 is performed, following step S31.

In step S32, the CPU 10 determines whether the attitude of the helicopter 80 in the yaw direction is different from the attitude of the virtual camera 90. Specifically, the CPU 10 reads out the object attitude data 110 and the camera attitude data 112 from the main memory, and determines whether the attitudes are different from each other for the yaw direction. If the determination result of step S32 is affirmative, the process of step S33 is performed. On the other hand, if the determination result of step S32 is negative, the process of step S34 is performed, skipping the process of step S33.

In step S33, the CPU 10 rotates the helicopter 80 gradually so as to follow the attitude of the virtual camera 90. Specifically, the helicopter 80 is rotated by a predetermined amount of rotation in such a direction that the attitude thereof is brought closer to the attitude of the virtual camera 90. The predetermined amount of rotation is determined in advance, and is set, for example, to a magnitude that is equal to or substantially equal to the maximum value for the amount of rotation in step S37 to be described later. In a case in which the attitude of the helicopter 80 and the attitude of the virtual camera 90 would be matched with each other if it were rotated by an amount of rotation less than or equal to the predetermined amount of rotation, the helicopter 80 is rotated by such an amount of rotation with which the attitudes are matched with each other. As a specific operation of step S33, the CPU 10 reads out the object attitude data 110 and the camera attitude data 112 from the main memory, and calculates a rotated attitude obtained by rotating the attitude represented by the object attitude data 110 by the method described above. Data representing the rotated attitude is stored in the main memory as new object attitude data 110. The process of step S34 is performed, following step S33.

With the process of step S33, the helicopter 80 rotates gradually so as to follow the attitude of the virtual camera 90, for the yaw direction. Thus, the attitude of the virtual camera 90 and the attitude of the helicopter 80 are matched with each other. Thus, it is possible to prevent the player from feeling awkward about the operation due to the direction of the helicopter 80 being not matched with the direction of the virtual camera 90 for the yaw direction, thereby improving the controllability of the helicopter 80. With the process of step S33, the rotation velocity of the helicopter 80 when following the attitude of the virtual camera 90 is kept to be less than or equal to a predetermined velocity, and it is therefore possible to make the action of the helicopter 80 natural even when the virtual camera 90 rotates fast. In other embodiments, the CPU 10 may, in step S39, control the attitude of the helicopter 80 so that it is matched with the attitude of the virtual camera 90. In other embodiments, the helicopter 80 may be rotated gradually so as to follow the virtual camera 90 when the rate of change in the attitude of the virtual camera 90 in accordance with the change of the attitude of the terminal device 7 is greater than or equal to a predetermined value, while the helicopter 80 is rotated so as to be matched with the virtual camera 90 when the rate of change in the attitude of the virtual camera 90 is less than the predetermined value.

In other embodiments, the processes of steps S32 and S33 may be skipped when the degree of necessity to match the attitude of the helicopter 80 and the attitude of the virtual camera 90 with each other is small. For example, in a case in which a game image as viewed from behind the helicopter 80, facing in the forward direction of the helicopter 80, is displayed on the television 2, the attitude of the helicopter 80 and the attitude of the virtual camera 90 do not have to be matched with each other in the game image displayed on the terminal device 7, and therefore the processes of steps S32 and S33 do not have to be performed.

In step S34, the CPU 10 controls the movement of the helicopter 80 in the forward-backward direction based on an input on the left analog stick 53A in the up-down direction. While the specific control method in step S34 may be any method, the helicopter 80 is moved in the forward-backward direction by an amount of movement in accordance with the amount by which the left analog stick 53A is operated in the up-down direction in the present embodiment. Specifically, the CPU 10 reads out the stick data 106 from the main memory, and calculates the amount of movement in the forward-backward direction based on the y component value in the two-dimensional coordinate system representing the operation on the left analog stick 53A (representing the amount of tilt in the up-down direction). Next, the CPU 10 calculates a moved position obtained by moving the un-moved position of the helicopter 80 by the calculated amount of movement in the forward-backward direction with respect to the helicopter 80. The "un-moved position of the helicopter 80" is represented by the object position data 111, and "the forward-backward direction with respect to the helicopter 80" is determined from the object attitude data 110. Therefore, the CPU 10 reads out the object attitude data 110 and the object position data 111 from the main memory, and calculates the moved position using these data. Data representing the calculated moved position is stored in the main memory as new object position data 111. The process of step S35 is performed, following step S34.

In step S35, the CPU 10 controls the movement of the helicopter 80 in the left-right direction based on an input on the left analog stick 53A in the left-right direction. While the specific control method in step S35 may be any method, the movement in the left-right direction is controlled by a method according to step S34 in the present embodiment. Specifically, the CPU 10 reads out the stick data 106 from the main memory, and calculates the amount of movement in the left-right direction based on the x component value in the two-dimensional coordinate system representing the operation on the left analog stick 53A (representing the amount of tilt in the left-right direction). Then, the CPU 10 reads out the object attitude data 110 and the object position data 111 from the main memory, and calculates a moved position obtained by moving the un-moved position of the helicopter 80 by the calculated amount of movement in the left-right direction with respect to the helicopter 80. Data representing the calculated moved position is stored in the main memory as new object position data 111. The process of step S36 is performed, following step S35.

In step S36, the CPU 10 controls the movement of the helicopter 80 in the up-down direction based on an input on the right analog stick 53B in the up-down direction. While the specific control method in step S36 may be any method, the movement in the up-down direction is controlled by a method according to step S34 in the present embodiment. Specifically, the CPU 10 reads out the stick data 106 from the main memory, and calculates the amount of movement in the left-right direction based on the y component value in the two-dimensional coordinate system representing the operation on the right analog stick 53B (representing the amount of tilt in the up-down direction). Then, the CPU 10 reads out the object attitude data 110 and the object position data 111 from the main memory, and calculates a moved position obtained by moving the un-moved position of the helicopter 80 by the calculated amount of movement in the up-down direction with respect to the helicopter 80. Data representing the calculated moved position is stored in the main memory as new object position data 111. The process of step S37 is performed, following step S36.

Through the processes of steps S34 to S36 described above, the position of the helicopter 80 is controlled based on an input on the analog stick 53. Specifically, the helicopter 80 is moved in any of three-dimensional directions (the forward-backward, left-right and up-down directions) in response to an input on the analog stick 53. Since the series of processes of steps S34 to S36 is performed within a one-frame process, the player can move the helicopter 80 in different directions simultaneously. That is, when the player makes an input on the left analog stick 53A in a diagonal direction or when the player simultaneously makes inputs on the analog sticks 53A and 53B, the helicopter 80 moves in a diagonal direction.

In the present embodiment, an input on the left analog stick 53A in the up-down direction corresponds to the forward-backward direction of the helicopter 80, an input on the left analog stick 53A in the left-right direction to the left-right direction of the helicopter 80, and an input on the right analog stick 53B in the up-down direction to the up-down direction of the helicopter 80. In other embodiments, the relationship between the input direction of the direction input section (the analog stick 53) and the moving direction of the control object (the helicopter 80) may be any other suitable relationship. For example, in other embodiments, an input on the right analog stick 53B in the left-right direction may correspond to the left-right direction of the helicopter 80 (in which case an input on the left analog stick 53A in the left-right direction may correspond to the rotation of the helicopter 80 in the left-right direction). For example, the roles of the left analog stick 53A and the right analog stick 53B may be reversed from those of the present embodiment. The movement in the screen depth direction (the viewing direction of the virtual camera 90: herein, the forward-backward direction of the helicopter 80) and the movement in the screen up-down direction (herein, the up-down direction of the helicopter 80) may be associated with inputs on the direction input section in the up-down direction. Then, the player may be allowed to easily operate the object with a natural control feel.

In step S37, the CPU 10 controls the rotation of the helicopter 80 in the yaw direction (left-right direction) based on an input on the right analog stick 53B in the left-right direction. While the specific control method in step S37 may be any method, the helicopter 80 is rotated in the yaw direction by an amount of rotation in accordance with the amount by which the right analog stick 53B is operated in the left-right direction in the present embodiment. Specifically, the CPU 10 reads out the stick data 106 from the main memory, and calculates the amount of rotation based on the x component value in the two-dimensional coordinate system representing the operation on the right analog stick 53B (representing the amount of tilt in the left-right direction). Then, the CPU 10 reads out the object attitude data 110 from the main memory, and calculates the rotated attitude obtained by rotating the un-rotated attitude represented by the object attitude data 110 by the above amount of rotation. Data representing the calculated rotated attitude is stored in the main memory as new object attitude data 110. The process of step S38 is performed, following step S37.

In the present embodiment, the attitude of the helicopter 80 is controlled based on an operation on the direction input section (the analog stick 53), as in step S37. In other embodiments, the attitude of the helicopter 80 may not be controlled based on an operation on the direction input section (the analog stick 53), in which case the process of step S37 does not have to be performed.

In the processes of steps S34 to S37, the amount of movement or the amount of rotation of the helicopter 80 is calculated in accordance with the operation amount (amount of slide) of the analog stick 53. In other embodiments, the amount of movement or the amount of rotation of the helicopter 80 may be a predetermined fixed amount. A touch panel may be used as the direction input section, in which case the amount of movement or the amount of rotation may be calculated so as to be an amount in accordance with the length of the line segment determined based on an input on the touch panel (which may be a line segment representing the input trace, or may be a line segment from a predetermined position to the touch position on the input surface).

In other embodiments, when the helicopter 80 is rotated by the process of step S37 (i.e., when there is an input on the right analog stick 53B in the left-right direction), the process of step S33 does not have to be performed. That is, while there is an input on the right analog stick 53B in the left-right direction, rotation based on this input may be executed with a higher priority, and rotation to follow the virtual camera 90 may be done after this input is discontinued. Conversely, rotation to follow the virtual camera 90 may be executed with a higher priority. That is, where rotation to follow the virtual camera 90 is executed (where the process of step S33 is performed), the process of step S37 may be skipped.

In step S38, the CPU 10 determines whether the helicopter 80 has been rotated in the yaw direction. The determination process of step S38 may be a process for determining whether the helicopter 80 has been rotated in the yaw direction (left-right direction) by an input on the analog stick 53, and the determination may be made based on whether there has been an input on the right analog stick 53B in the left-right direction. Specifically, the CPU 10 makes the determination by referencing the stick data 106 which has been read out from the main memory. If the determination result of step S38 is affirmative, the process of step S39 is performed. On the other hand, if the determination result of step S38 is negative, the process of step S40 is performed, skipping the process of step S39.

In step S39, the CPU 10 rotates the virtual camera 90 in the yaw direction based on the attitude of the helicopter 80 in the yaw direction. That is, the attitude of the virtual camera 90 is rotated in the yaw direction by same angle as the angle by which the attitude of the helicopter 80 has been rotated. Specifically, the CPU 10 reads out the object attitude data 110 from the main memory, and calculates the changed attitude of the virtual camera 90. Then, data representing the changed attitude of the virtual camera 90 is stored in the main memory as new camera attitude data 112. The process of step S40 is performed, following step S39.

In the present embodiment, the processes of steps S38 and S39 are performed so that the attitude of the helicopter 80 and the attitude of the virtual camera 90 are matched with each other for the yaw direction. In other embodiments, the CPU 10 may perform processes similar to steps S38 and S39 also for the pitch direction and/or roll direction, other than the yaw direction, so that the attitude of the helicopter 80 and the attitude of the virtual camera 90 are matched with each other.

In step S40, the CPU 10 controls the position of the virtual camera 90 so that the helicopter 80 is included in the viewing field range of the virtual camera 90. The position of the virtual camera 90 is set based on the position of the helicopter 80 and the attitude of the virtual camera 90. Specifically, the CPU 10 reads out the object position data 111 and the camera attitude data 112 from the main memory, and calculates the position of the virtual camera 90 so that the virtual camera 90 is at a predetermined distance from the position of the helicopter 80 while facing that position (see FIG. 15). Then, data representing the calculated position is stored in the main memory as the camera position data 113. Since the position of the virtual camera 90 is controlled based on the position of the helicopter 80 which is controlled based on an input on the direction input section (the analog stick 53) in step S40, it can be said that in the present embodiment, the position of the virtual camera 90 is controlled based on an input on the direction input section. The process of step S41 is performed, following step S40.

In other embodiments, if the terminal game image is a first-person perspective image as viewed from the helicopter 80, the virtual camera 90 may be set at the same position as the helicopter 80.

In step S41, the CPU 10 controls the shooting action of the helicopter 80. Specifically, the CPU 10 first reads out the operation button data 105 from the main memory, and determines whether a predetermined shooting operation (e.g., an operation of pressing the first L button 54I or the first R button 54J) has been performed. When a shooting operation is performed, the CPU 10 has the helicopter 80 execute an action of firing a bullet at a position (in the game space) indicated by the cursor 81. In other embodiments, the shooting operation may be an operation on the touch panel 52. That is, when an operation on the touch panel 52 is performed, the CPU 10 may have the helicopter 80 execute an action of firing a bullet at a position in the game space indicated by the touch position. After step S41, the CPU 10 ends the object control process.

While the controlled object (the helicopter 80) is made to execute a shooting action in step S41 in the present embodiment, the controlled object may be made to perform other actions in other embodiments. For example, the CPU 10 may have the controlled object execute another attacking action, an action of using an item, etc.

With the object control process, the action of the helicopter 80 in the virtual game space is controlled based on an input on the direction input section (the analog stick 53). In the present embodiment, since inputs on the analog sticks 53 in the up-down direction are associated with the movement of the helicopter 80 in the forward-backward direction and that in the up-down direction (steps S34 and S36), respectively, the player can easily control the helicopter 80 with a natural control feel. Since an input on the left analog stick 53A in the left-right direction is associated with the movement of the helicopter 80 in the left-right direction (step S35), the helicopter 80 can be moved, using the analog sticks 53, in any direction in the three-dimensional space. Moreover, since an input on the right analog stick 53B in the left-right direction is associated with the rotation of the helicopter 80 in the yaw direction (step S37), it is possible not only to translate the helicopter 80 but also to change the attitude of the helicopter 80.

In other embodiments, the CPU 10 may control the attitude and/or position of the helicopter 80 based on the attitude of the terminal device 7 in the roll direction or the pitch direction. For example, when the terminal device 7 is tilted from a predetermined reference state in the roll direction, the helicopter 80 may be rotated in the roll direction by an amount of rotation in accordance with the amount of tilt from the reference state. The predetermined reference state refers to a predetermined state where the x axis of the terminal device 7 is horizontal, for example. Moreover, in such a case, the CPU 10 may move the helicopter 80 in the left-right direction by an amount of movement in accordance with the amount of tilt. The direction in which the helicopter 80 is moved may be the left-right direction of the helicopter 80 or the horizontal direction in the game space. Also with the pitch direction, as with the roll direction, when the terminal device 7 is tilted from a predetermined reference state in the pitch direction, the CPU 10 may rotate the helicopter 80 in the pitch direction by an amount of rotation in accordance with the amount of tilt from the reference state.

With the object control process, the attitude of the virtual camera 90 changes based on the attitude of the terminal device 7 (step S31). Thus, the player can change the viewing direction in the game image by an operation of changing the attitude of the terminal device 7, and can therefore easily change the viewing direction by an intuitive operation. Since the player is allowed to simultaneously perform the operation of changing the attitude of the terminal device 7 and the operation on the analog sticks 53, and player can easily perform operations on the helicopter 80.

With the object control process, when the attitude of the helicopter 80 changes in the yaw direction in response to an input on the analog stick 53 (Yes in step S38), the attitude of the virtual camera 90 is changed so that the attitude of the virtual camera 90 rotates in the yaw direction by the same amount as the attitude of the helicopter 80 (step S39). Therefore, for the yaw direction, the direction of the helicopter 80 and the direction of the virtual camera 90 can be matched with each other, and it is therefore possible to prevent the player from feeling awkward about the operation. In other embodiments, as with the processes of steps S32 and S33, the processes of steps S38 and S39 may be skipped when the degree of necessity to match the attitude of the helicopter 80 and the attitude of the virtual camera 90 with each other is small.

Referring back to FIG. 20, a series of processes of steps S13 to S15 is performed, following the object control process of step S12. The series of processes of steps S13 to S15 is a process for controlling the actions of the player objects 82 to 85 and for controlling the virtual camera for displaying the player objects 82 to 85. The series of processes of steps S13 to S15 is performed for each player object. That is, since there are four player objects in the present embodiment, the processes of steps S13 to S15 are performed for each of the four player objects 82 to 85.

In step S13, the CPU 10 controls the movement of the player object based on an operation on the controller 5. Specifically, the CPU 10 reads out the controller operation data 107 from the main memory, and moves the player object based on the controller operation data 107. Data representing the moved position is stored in the main memory. The method for controlling the player object may be any method. For example, the player object may move at a predetermined velocity in a direction in accordance with the direction input on the cross button 32a of the controller 5. In a case in which a device which has an analog stick is connected to the controller 5, the movement of the player object may be controlled based on a direction input on the analog stick. The process of step S14 is performed, following step S13.

In step S14, the CPU 10 controls the position and the attitude of the virtual camera for generating the television game image. The virtual camera may be controlled in any manner as long as the player object is included in the viewing field range. For example, the CPU 10 sets the virtual camera at a position that is behind the player object and slightly above the position of the player object, and in an attitude facing toward the player object. Data representing the set position and attitude of the virtual camera is stored in the main memory. In the present embodiment, four such virtual cameras are set since the screen of the television 2 is divided into four and four game images are displayed on the television 2. The four virtual cameras correspond respectively to the four player objects, and are controlled so that the corresponding player objects are included in the viewing field range. The process of step S15 is performed, following step S14.

In step S15, the CPU 10 controls the shooting action by a player object. Specifically, the CPU 10 first calculates the position of the cursor (the cursors 86 to 89 shown in FIG. 12). While the position of the cursor may be determined in any manner, the position of the cursor may be calculated as the position on the screen indicated by the image-capturing direction of the controller 5 (the z axis shown in FIG. 3), for example. This position can be calculated from the marker coordinates described above. For example, the position of the cursor may be calculated so that it moves in accordance with the direction input on the cross button 32a of the controller 5. Then, the CPU 10 reads out the controller operation data 107 from the main memory to determine whether a predetermined shooting operation (e.g., the A button 32d) has been performed. When a shooting operation is performed, the CPU 10 has the player object execute an action of firing a bullet at a position (in the game space) indicated by the cursor. The process of step S16 is performed, following step S15.

In step S16, the CPU 10 performs other game progress processes. Other game progress processes are those performed in the game control process of step S4, other than the processes of steps S11 to S15. The above and other game progress processes include, for example, the process of controlling the action of objects other than the helicopter 80 and the player objects 82 to 85 (e.g., a bullet fired in a shooting action), the process of determining whether a bullet has hit the helicopter 80 and the player objects 82 to 85, and the process of changing a parameter (e.g., a parameter representing the hit point) of the object which has been hit by a bullet, etc. Processes for allowing the game to progress, other than those described above are performed in step S16 as necessary. The CPU 10 ends the game control process after step S16.

Referring back to FIG. 19, in step S5 following step S4 (the game control process), the television game image to be displayed on the television 2 is generated by the CPU 10 and the GPU 11b. That is, the CPU 10 and the GPU 11b read out data representing the results of the game control process of step S4 from the main memory, and read out data used for generating the game image from the VRAM 11d, to generate the television game image. In the present embodiment, first, based on each virtual camera set in step S14, an image representing the game space as viewed from the virtual camera is generated, and an image of the cursor is added to the generated image. Then, the four images are combined together into a single image, thereby obtaining the television game image. The generated television game image is stored in the VRAM 11d. The process of step S6 is performed, following step S5.

In step S6, the terminal game image to be displayed on the terminal device 7 is generated by the CPU 10 and the GPU 11b. That is, the CPU 10 and the GPU 11b read out data representing the results of the game control process of step S4 from the main memory, and read out data used for generating the game image from the VRAM 11d, to generate the terminal game image. In the present embodiment, the CPU 10 reads out the camera attitude data 112 and the camera position data 113 from the main memory, and an image of the game space as viewed from the virtual camera is generated by the CPU 10 and the GPU 11b. The terminal game image is generated by adding an image of the cursor 81 at a predetermined position in the generated image (e.g., a position slightly above the center of the image (see FIG. 11)). The generated terminal game image is stored in the VRAM 11d. The process of step S7 is performed, following step S6.

In step S7, the CPU 10 outputs the game image to the television 2. Specifically, the CPU 10 sends data of the television game image stored in the VRAM 11d to the AV-IC 15. In response to this, the AV-IC 15 outputs data of the television game image to the television 2 via the AV connector 16. Thus, the television game image is displayed on the television 2. In step S7, the game sound data may be output to the television 2, together with the game image data, so that the game sound is output from the speaker 2a of the television 2. The process of step S8 is performed, following step S7.

In step S8, the CPU 10 transmits the game image to the terminal device 7. Specifically, image data of the terminal game image stored in the VRAM 11d is sent to the codec LSI 27 by the CPU 10, and a predetermined compression process is performed by the codec LSI 27. The compressed image data is transmitted to the terminal device 7 by the terminal communication module 28 via the antenna 29. The terminal device 7 receives image data transmitted from the game device 3 by means of the wireless module 70, and a predetermined expansion process is performed on the received image data by the codec LSI 66. The expanded image data is output to the LCD 51. Thus, the terminal game image is displayed on the LCD 51. In step S8, game sound data may be transmitted to the terminal device 7, together with game image data, so that the game sound is output from the speaker 67 of the terminal device 7. The process of step S9 is performed, following step S8.

In the present embodiment, the cursor 81 is displayed at a predetermined position on the screen of the LCD 51. Therefore, the player can change the position indicated by the cursor 81 (i.e., the shooting direction) by changing the attitude of the virtual camera (the viewing direction in the game image) through an operation of changing the attitude of the terminal device 7. Then, the player can easily and quickly change the shooting direction by changing the attitude of the terminal device 7.

In step S9, the CPU 10 determines whether the game should be ended. The determination of step S9 is made based on whether the game is over, or whether the player has given an instruction to quit the game, etc. If the determination result of step S9 is negative, the process of step S2 is performed again. On the other hand, if the determination result of step S9 is affirmative, the CPU 10 ends the game process shown in FIG. 19. Thereafter, the series of processes of steps S2 to S9 is repeatedly performed until it is determined in step S9 that the game should be ended.

With the game processes described above, it is possible to three-dimensionally change the position and attitude of the controlled object (the helicopter 80 and the virtual camera 90) through a direction input command given by an operation on the two analog sticks 53 and a direction input command given by an operation of changing the attitude of the terminal device 7 itself. With the present embodiment, direction input commands for a plurality of directions can be given easily using the terminal device 7, thus improving the controllability in giving direction input commands for a plurality of directions.

[7. Variations]

The embodiment above is illustrative, and the game system can be implemented with the following configurations, for example, in other embodiments.

(Variation Regarding Calculation of Attitude of Terminal Device)

In the embodiment above, the attitude of the terminal device 7 is calculated by using the detection results of inertia sensors (the acceleration sensor 63 and the gyrosensor 64) of the terminal device 7. In other embodiments, the method for calculating the attitude of the terminal device 7 may be any method. For example, in other embodiments, the attitude of the terminal device 7 may be calculated using the detection results of other sensor sections of the terminal device 7 (e.g., the magnetic sensor 62 and the camera 56). For example, in a case in which the game system 1 includes a camera for capturing an image of the terminal device 7, separately from the terminal device 7, the game device 3 may use the image-capturing result obtained by capturing an image of the terminal device 7 with the camera to calculate the attitude of the terminal device 7.

(Variation Regarding Objects Controlled by the Terminal Device 7)

In the embodiment above, objects controlled by the terminal device 7, i.e., controlled objects whose position is controlled by the analog stick 53 and whose attitude is controlled by the attitude of the terminal device 7, are the helicopter 80 and the virtual camera 90. Herein, the object controlled by the terminal device 7 may be any object placed in the virtual space. For example, in other embodiments, the object controlled by the terminal device 7 may be only the virtual camera or may be only a predetermined object.

(Variation Regarding Contents of Game)

While a game in which a plurality of players play against one another is described in the embodiment above, the contents of the game may by of any kind in other embodiments. For example, in other embodiments, a single-player game may be performed in which a moving object such as an airplane or a car is controlled by the terminal device 7. In other embodiments, a game may be performed in which no controlled object is placed (or displayed), and the virtual camera (the viewpoint or the viewing direction of the game image) is controlled by the terminal device 7.

(Variation Regarding Configuration of Game System 1)

In the embodiment above, the game system 1 has a configuration including the terminal device 7 and the controller 5, which function as controller devices, and the game device 3 for performing the game processes. Herein, the game system may have any configuration as long as it includes a controller device, and a game process section for performing game processes based on operations on the controller device. For example, in other embodiments, a controller device (the terminal device 7 in the embodiment above) may include a game process section. That is, the game system may be implemented by a single portable game device. In other embodiments, the game system may include a plurality of terminal devices 7, wherein a plurality of players control controlled objects (the helicopters 80 and the virtual cameras 90) using the terminal devices 7.

(Variation Regarding Information Processing Device Performing Game Process)

While the series of game processes of the game system 1 is performed by the game device 3 in the embodiment above, some of the game processes may be performed by another device. For example, in other embodiments, some of the game processes (e.g., the process of generating the terminal game image) may be performed by the terminal device 7. In other embodiments, in a game system that includes a plurality of information processing devices that can communicate with each other, the game processes may be divided among the plurality of information processing devices.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable to a game system or a game device, with the aim of, for example, improving the controllability in giving input commands for a plurality of directions.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising a first controller device, and a game process section for performing a game process based on an operation on the first controller device, wherein:
    the first controller device comprises:
        a direction input section(s) that is configured to accept input that corresponds to at least two different directions;
        a sensor section for obtaining a physical quantity used for calculating an attitude of the first controller device; and
        a display section for displaying a game image; and
    the game process section comprises:

an attitude calculation section for calculating the attitude of the first controller device based on the physical quantity obtained by the sensor section;

a camera attitude control section for controlling an attitude of a virtual camera in a virtual space based on the attitude of the first controller device;

a camera position control section for controlling a position of the virtual camera based on an input from at least one of the direction input section(s) and so that a predetermined object is included in a viewing field range of the virtual camera;

an image generation section for generating the game image to be displayed on the display section based on the position and the attitude of the virtual camera; and an object control section for controlling a position of the predetermined object in the virtual space based on an input to at least one of the direction input section(s), wherein the object control section controls an attitude of the predetermined object based on an input to at least one of the direction input section(s), when the attitude of the predetermined object is changed by the object control section at least for a predetermined direction, the camera attitude control section changes the attitude of the virtual camera so that the attitude of the predetermined object and the attitude of the virtual camera are matched with each other for the predetermined direction.

2. The game system according to claim 1, wherein when the attitude of the virtual camera is changed for a direction in response to a change in an attitude of the first controller device, the object control section changes the attitude of the predetermined object so that the attitude of the predetermined object and the attitude of the virtual camera are matched with each other for the direction.

3. The game system according to claim 1, wherein
the direction input section(s) includes a first direction input section and a second direction input section, and
the object control section controls a movement of the predetermined object in a predetermined first moving direction that has a component of a viewing direction of the virtual camera in response to a first direction input on the first direction input section, and controls a movement of the predetermined object in a second moving direction that is perpendicular to the first moving direction and corresponds to a screen up-down direction of the display section in response to a second direction input on the second direction input section.

4. The game system according to claim 3, wherein the object control section controls a movement of the predetermined object in a third moving direction that is perpendicular to the first and second moving directions in response to a third direction input on one of the first and second direction input sections.

5. The game system according to claim 4, wherein the object control section controls an attitude of the predetermined object in response to a fourth direction input on the other one of the first and second direction input sections.

6. The game system according to claim 5, wherein:
at least up, down, left and right directions can be input with the plurality of direction input sections;
the first direction input and the second direction input are inputs in an up-down direction; and
the third direction input and the fourth direction input are inputs in a left-right direction.

7. The game system according to claim 1, wherein:
the first controller device further comprises a depressible key operation section; and
the object control section has the predetermined object execute a predetermined action in response to a key operation on the key operation section.

8. The game system according to claim 1, wherein:
the first controller device further comprises a touch panel provided on a screen of the display section; and
the object control section has the predetermined object execute a predetermined action in response to an operation on the touch panel.

9. The game system according to claim 1, wherein:
the direction input section(s) are a first direction input section and a second direction input section provided on a left and a right side of the display section; and
with each one of the direction input section(s), an input operation can be performed by moving an operation member that is movable in a two-dimensional direction.

10. The game system according to claim 1, wherein the sensor section includes an inertia sensor.

11. The game system according to claim 1, wherein in response to a predetermined operation specifying a position on a screen of the display section, the game process section performs a process of shooting at a position in the virtual space corresponding to the specified position.

12. The game system according to claim 1, wherein:
the game system comprises:
a game device that includes the game process section and outputs a second game image to a predetermined display device different from the display section; and
one or more second controller devices different from the first controller device;
the game process section performs a game process based on an operation on the first controller device and an operation on the one or more second controller devices; and
the image generation section generates the game image to be displayed on the display section, and the second game image to be displayed on the predetermined display device.

13. The game system according to claim 12, wherein the game process section has a first object, which is moved in any three-dimensional direction in the virtual space based on an input to at least one of the plurality of direction input sections, execute a shooting action based on an operation on the first controller device, and has a second object, which can move on a predetermined plane in the virtual space, execute a moving action and a shooting action based on an operation on the one or more second controller devices.

14. The game system according to claim 1, wherein:
the game system comprises a game device including the game process section;
the game device includes an image transmitting section for compressing and wirelessly transmitting the game image to the first controller device;
the first controller device includes an image receiving section for receiving and decompressing the compressed game image which is transmitted by the image transmitting section; and
the display section displays the game image decompressed by the image receiving section.

15. The game system according to claim 1, wherein the first controller device is a portable game device including the game process section.

16. The game system of claim 1, wherein the game process section is physically separate from the first controller device.

17. The game system of claim 1, wherein the game process section further comprises a transmitter that is configured to transmit the game image to the first controller device.

18. A game system comprising a first controller device, and a game process section for performing a game process based on an operation on the first controller device, wherein:
the first controller device comprises:
a plurality of direction input sections;
a sensor section for obtaining a physical quantity used for calculating an attitude of the first controller device; and
a display section for displaying a game image; and
the game process section comprises:
an attitude calculation section for calculating the attitude of the first controller device based on the physical quantity obtained by the sensor section;
a camera attitude control section for controlling an attitude of a virtual camera in a virtual space based on the attitude of the first controller device;
a camera position control section for controlling a position of the virtual camera based on an input from at least one of the direction input section(s) and so that a predetermined object is included in a viewing field range of the virtual camera;
an image generation section for generating the game image to be displayed on the display section based on the position and the attitude of the virtual camera; and
an object control section for controlling a position of the predetermined object in the virtual space based on an input to at least one of the plurality of direction input sections,
wherein when the attitude of the virtual camera changes in response to a change in the attitude of the first controller device for a predetermined direction at least at a predetermined velocity or more, the object control section matches the attitude of the predetermined object and the attitude of the virtual camera with each other by gradually changing the attitude of the predetermined object so as to follow the virtual camera.

19. The game system according to claim 18, wherein
the direction input section(s) includes a first direction input section and a second direction input section, and
the object control section controls a movement of the predetermined object in a predetermined first moving direction that has a component of a viewing direction of the virtual camera in response to a first direction input on the first direction input section, and controls a movement of the predetermined object in a second moving direction that is perpendicular to the first moving direction and corresponds to a screen up-down direction of the display section in response to a second direction input on the second direction input section.

20. The game system according to claim 19, wherein the object control section controls a movement of the predetermined object in a third moving direction that is perpendicular to the first and second moving directions in response to a third direction input on one of the first and second direction input sections.

21. The game system according to claim 20, wherein the object control section controls an attitude of the predetermined object in response to a fourth direction input on the other one of the first and second direction input sections.

22. The game system according to claim 21, wherein:
at least up, down, left and right directions can be input with the direction input section(s);
the first direction input and the second direction input are inputs in an up-down direction; and
the third direction input and the fourth direction input are inputs in a left-right direction.

23. The game system according to claim 18, wherein:
the first controller device further comprises a depressible key operation section; and
the object control section has the predetermined object execute a predetermined action in response to a key operation on the key operation section.

24. The game system according to claim 18, wherein:
the first controller device further comprises a touch panel provided on a screen of the display section; and
the object control section has the predetermined object execute a predetermined action in response to an operation on the touch panel.

25. The game system according to claim 18, wherein:
the direction input section(s) are a first direction input section and a second direction input section provided on a left and a right side of the display section; and
with each one of the direction input section(s), an input operation can be performed by moving an operation member that is movable in a two-dimensional direction.

26. The game system according to claim 18, wherein the sensor section includes an inertia sensor.

27. The game system according to claim 18, wherein in response to a predetermined operation specifying a position on a screen of the display section, the game process section performs a process of shooting at a position in the virtual space corresponding to the specified position.

28. The game system according to claim 18, wherein:
the game system comprises:
a game device that includes the game process section and outputs a second game image to a predetermined display device different from the display section; and
one or more second controller devices different from the first controller device;
the game process section performs a game process based on an operation on the first controller device and an operation on the one or more second controller devices; and
the image generation section generates the game image to be displayed on the display section, and the second game image to be displayed on the predetermined display device.

29. The game system according to claim 28, wherein the game process section has a first object, which is moved in any three-dimensional direction in the virtual space based on an input to at least one of the direction input section(s), execute a shooting action based on an operation on the first controller device, and has a second object, which can move on a predetermined plane in the virtual space, execute a moving action and a shooting action based on an operation on the one or more second controller devices.

30. The game system according to claim 18, wherein:
the game system comprises a game device including the game process section;
the game device includes an image transmitting section for compressing and wirelessly transmitting the game image to the first controller device;
the first controller device includes an image receiving section for receiving and decompressing the compressed game image which is transmitted by the image transmitting section; and
the display section displays the game image decompressed by the image receiving section.

31. The game system according to claim 18, wherein the first controller device is a portable game device including the game process section.

32. The game system of claim 18, wherein the game device is physically separate from the first controller device.

33. The game system of claim 18, wherein the game device further comprises a transmitter that is configured to transmit the game image to the first controller device.

34. A game process method carried out by one or more game devices for performing a game process based on an operation on a first controller device, wherein:
the first controller device comprises:
a direction input section(s) that is configured to accept input that corresponds to at least two different directions;
a sensor section for obtaining a physical quantity used for calculating an attitude of the first controller device; and
a display section for displaying a game image, the game process method comprising:
calculating the attitude of the first controller device based on the physical quantity obtained by the sensor section;
controlling an attitude of a virtual camera in a virtual space based on the attitude of the first controller device;
controlling a position of the virtual camera based on an input to one or more of the plurality of direction input sections;
controlling a position of a predetermined object in the virtual space based on an input on one or more of the direction input section(s);
controlling an attitude of the predetermined object based on an input on one or more of the direction input section(s); and
generating the game image to be displayed on the display section based on the position and the attitude of the virtual camera,
wherein the position of the virtual camera is controlled so that the predetermined object is included in a viewing field range of the virtual camera,
when the attitude of the predetermined object is controlled to change at least for a predetermined direction, changing the attitude of the virtual camera so that the attitude of the predetermined object and the attitude of the virtual camera are matched with each other for the predetermined direction.

35. The game process method according to claim 34, wherein in the object control, when the attitude of the virtual camera is changed for a direction in response to a change in an attitude of the first controller device, the game device changes the attitude of the predetermined object so that the attitude of the predetermined object and the attitude of the virtual camera are matched with each other for the direction.

36. The game process method according to claim 34, further comprising:
controlling a movement of the predetermined object in a predetermined first moving direction that has a component of a viewing direction of the virtual camera in response to a first direction input on a first direction input section of the direction input section(s) of the first controller device; and
controlling a movement of the predetermined object in a second moving direction that is perpendicular to the first moving direction and corresponds to a screen up-down direction of the display section in response to a second direction input on a second direction input section of the direction input section(s) of the first controller device.

37. The game process method according to claim 36, further comprising controlling a movement of the predetermined object in a third moving direction that is perpendicular to the first and second moving directions in response to a third direction input on one of the first and second direction input sections.

38. The game process method according to claim 37, further comprising controlling an attitude of the predetermined object in response to a fourth direction input on the other one of the first and second direction input sections.

39. The game process method according to claim 38 wherein:
at least up, down, left and right directions can be input with the direction input section(s);
the first direction input and the second direction input are inputs in an up-down direction; and
the third direction input and the fourth direction input are inputs in a left-right direction.

40. The game process method according to claim 34, wherein:
the first controller device further comprises a depressible key operation section; and
the game process method further comprises controlling the predetermined object to execute a predetermined action in response to a key operation on the depressible key operation section.

41. The game process method according to claim 34, wherein:
the first controller device further comprises a touch panel provided on a screen of the display section; and
the game process method further comprises controlling the predetermined object to execute a predetermined action in response to an operation on the touch panel.

42. The game process method according to claim 34, further comprising, in response to a predetermined operation specifying a position on a screen of the display section, performing a process of shooting at a position in the virtual space corresponding to the specified position.

43. The game process method according to claim 34, further comprising:
performing a predetermined game process based on an operation on the first controller device and an operation on one or more second controller devices different from the first controller device; and
generating a second game image to be displayed on a predetermined display device different from the display section based on a result of the game process performed in the game process.

44. The game process method according to claim 43, wherein in the game process, the game device has a first object, which is moved in any three-dimensional direction in the virtual space based on an input to one or more of the direction input section(s), execute a shooting action based on an operation on the first controller device, and has a second object, which can move on a predetermined plane in the virtual space, execute a moving action and a shooting action based on an operation on the one or more second controller devices.

45. A game process method carried out by one or more game devices for performing a game process based on an operation on a first controller device, wherein:
the first controller device comprises:
a direction input section(s) that is configured to accept input that corresponds to at least two different direction;
a sensor section for obtaining a physical quantity used for calculating an attitude of the first controller device; and
a display section for displaying a game image, the game process method comprising:
calculating the attitude of the first controller device based on the physical quantity obtained by the sensor section;

controlling an attitude of a virtual camera in a virtual space based on the attitude of the first controller device;

controlling a position of the virtual camera based on an input to one or more of the direction input section(s);

controlling a position of a predetermined object in the virtual space based on an input on one or more of the direction input section(s); and generating the game image to be displayed on the display section based on the position and the attitude of the virtual camera, wherein the position of the virtual camera is controlled so that the predetermined object is included in a viewing field range of the virtual camera, wherein when the attitude of the virtual camera changes in response to a change in the attitude of the first controller device for a predetermined direction at least at a predetermined velocity or more, matching the attitude of the predetermined object and the attitude of the virtual camera with each other by gradually changing the attitude of the predetermined object so as to follow the virtual camera.

46. A game device for performing a game process based on an operation on a controller device that includes a direction input section(s) that is configured to accept input that corresponds to at least two different directions, at least one sensor configured to obtain a physical quantity used for calculating an attitude of the controller device, and a display device configured to display a game image, the game device comprising:

a processing system that includes at least one processor, the processing system configured to:

determine the attitude of the controller device based on the physical quantity obtained by the at least one sensor;

control an attitude of a virtual camera in a virtual space based on the determined attitude of the controller device;

control a position of the virtual camera based on an input provided using at least one of the direction input section(s) of the controller device;

generate the game image to be displayed on the display device of the controller device based on the position and the attitude of the virtual camera;

control a position of a virtual object in the virtual space based on an input that is provided to at least one of direction input section(s);

control the position of the virtual camera so that the virtual object is included in a viewing field range of the virtual camera;

control an attitude of the virtual object based on an input to at least one of the direction input section(s); and when the attitude of the virtual object is changed at least for a predetermined direction, set the attitude of the virtual camera so that the attitude of the virtual object and the attitude of the virtual camera are matched with each other for the predetermined direction.

47. The game device according to claim 46, wherein when the attitude of the virtual camera is changed for a predetermined direction in response to a change in an attitude of the controller device, the attitude of the virtual object is changed so that the attitude of the virtual object and the attitude of the virtual camera are matched with each other for the predetermined direction.

48. The game device according to claim 46, wherein the processing system is further configured to:

control a movement of the virtual object in a first moving direction that has a component of a viewing direction of the virtual camera in response to a first direction input on a first direction input section of the controller device; and control a movement of the virtual object in a second moving direction that is transverse to the first moving direction and corresponds to a screen up-down direction of the display device in response to a second direction input on a second direction input section of the controller device.

49. The game device according to claim 48, wherein the processing system is further configured to control a movement of the virtual object in a third moving direction that is transverse to the first and second moving directions in response to a third direction input on one of the first and second direction input sections.

50. The game device according to claim 49, wherein the processing system is further configured to control an attitude of the virtual object in response to a fourth direction input on the other one of the first and second direction input sections.

51. The game device of claim 46, wherein the game device is remotely located from the controller device.

52. A game device for performing a game process based on an operation on a controller device that includes a direction input section(s) that is configured to accept input that corresponds to at least two different directions, at least one sensor configured to obtain a physical quantity used for calculating an attitude of the controller device, and a display device configured to display a game image, the game device comprising:

a processing system that includes at least one processor, the processing system configured to:

determine the attitude of the controller device based on the physical quantity obtained by the at least one sensor;

control an attitude of a virtual camera in a virtual space based on the determined attitude of the controller device;

control a position of the virtual camera based on an input provided using at least one of the direction input section(s) of the controller device;

generate the game image to be displayed on the display device of the controller device based on the position and the attitude of the virtual camera;

control a position of a virtual object in the virtual space based on an input that is provided to at least one of the direction input section(s); and control the position of the virtual camera so that the virtual object is included in a viewing field range of the virtual camera, wherein when the attitude of the virtual camera changes in response to a change in the attitude of the controller device for a predetermined direction at least at a predetermined velocity or more, the attitude of the virtual object and the attitude of the virtual camera are matched with each other by gradually changing the attitude of the virtual object so as to follow the virtual camera.

53. A non-transitory computer-readable storage medium storing a game program to be executed by a computer of a game device for performing a game process based on an operation on a controller device that includes a direction input section(s) that is configured to accept input that corresponds to at least two different directions, a sensor for obtaining a physical quantity used for calculating an attitude of the controller device, and a display for displaying a game image, the game program comprising instructions that instruct the computer to execute:

attitude calculation for calculating the attitude of the controller device based on the physical quantity obtained by the sensor, camera attitude control for controlling an attitude of a virtual camera in a virtual space based on the attitude of the controller device;

camera position control for controlling a position of the virtual camera based on an input on at least one of the direction input section(s) such that a predetermined object is included in a viewing field range of the virtual camera;

image generation for generating the game image to be displayed on the display based on the position and the attitude of the virtual camera; and object control for controlling a position of the predetermined object in the virtual space based on an input on at least one of the direction input section(s) and the object control controls an attitude of the predetermined object based on an input on at least one of the direction input section(s), when the attitude of the predetermined object is changed by the object control at least for a predetermined direction, the camera attitude control changes the attitude of the virtual camera so that the attitude of the predetermined object and the attitude of the virtual camera are matched with each other for the predetermined direction.

54. The non-transitory computer-readable storage medium according to claim 53, wherein when the attitude of the virtual camera is changed for a direction in response to a change in an attitude of the controller device, the object control changes the attitude of the predetermined object so that the attitude of the predetermined object and the attitude of the virtual camera are matched with each other for the direction.

55. The non-transitory computer-readable storage medium according to claim 53, wherein the object control controls a movement of the predetermined object in a predetermined first moving direction that has a component of a viewing direction of the virtual camera in response to a first direction input on a first direction input section of the controller device, and controls a movement of the predetermined object in a second moving direction that is perpendicular to the first moving direction and corresponds to a screen up-down direction of the display in response to a second direction input on a second direction input section of the controller device.

56. The non-transitory computer-readable storage medium according to claim 55, wherein the object control controls a movement of the predetermined object in a third moving direction that is perpendicular to the first and second moving directions in response to a third direction input on one of the first and second direction input sections.

57. The non-transitory computer-readable storage medium according to claim 56, wherein the object control controls an attitude of the predetermined object in response to a fourth direction input on the other one of the first and second direction input sections.

58. A non-transitory computer-readable storage medium storing a game program to be executed by a computer of a game device for performing a game process based on an operation on a controller device that includes a direction input section(s) that is configured to accept input that corresponds to at least two different directions, a sensor for obtaining a physical quantity used for calculating an attitude of the controller device, and a display for displaying a game image, the game program comprising instructions that instruct the computer to execute:

attitude calculation for calculating the attitude of the controller device based on the physical quantity obtained by the sensor, camera attitude control for controlling an attitude of a virtual camera in a virtual space based on the attitude of the controller device;

camera position control for controlling a position of the virtual camera based on an input on at least one of the direction input section(s) such that a predetermined object is included in a viewing field range of the virtual camera;

image generation for generating the game image to be displayed on the display based on the position and the attitude of the virtual camera; and object control for controlling a position of the predetermined object in the virtual space based on an input on at least one of the direction input section(s), wherein when the attitude of the virtual camera changes in response to a change in the attitude of the controller device for a predetermined direction at least at a predetermined velocity or more, the object control matches the attitude of the predetermined object and the attitude of the virtual camera with each other by gradually changing the attitude of the predetermined object so as to follow the virtual camera.

* * * * *